(12) United States Patent
Rivera et al.

(10) Patent No.: US 10,857,963 B1
(45) Date of Patent: *Dec. 8, 2020

(54) DEPLOYABLE PASSENGER ENCLOSURE

(71) Applicant: Waymo LLC, Mountain View, CA (US)

(72) Inventors: Felix Jose Alvarez Rivera, Tarzana, CA (US); Daniel Lynn Larner, San Jose, CA (US); Thomas Daniel, San Francisco, CA (US); Courtney McCool, San Jose, CA (US); Atul Gupta, San Jose, CA (US); Peter Craig Lombrozo, Scotts Valley, CA (US)

(73) Assignee: Waymo LLC, Mountain View, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/010,862

(22) Filed: Jun. 18, 2018

Related U.S. Application Data

(63) Continuation of application No. 15/228,328, filed on Aug. 4, 2016, now Pat. No. 10,023,145.

(51) Int. Cl.
*B60R 21/207* (2006.01)
*B60R 21/2334* (2011.01)
(Continued)

(52) U.S. Cl.
CPC ........ *B60R 21/207* (2013.01); *B60R 21/0134* (2013.01); *B60R 21/0136* (2013.01);
(Continued)

(58) Field of Classification Search
CPC ..... B60R 21/06; B60R 21/207; B60R 21/214; B60R 21/0134; B60R 21/0136;
(Continued)

(56) References Cited

U.S. PATENT DOCUMENTS 3,774,936 A 11/1973 Barnett et al.
3,836,168 A * 9/1974 Nonaka ................... B60R 21/08
280/733

(Continued)

OTHER PUBLICATIONS

"Harpoon, Grid Club—Book: The Egyptians, Section: Ancient Egypt, Chapter: Games and Hunting [online] [retrieved Jul. 21, 2016]. Retrieved from the Internet: <https://gridclub.com/subscribers/info/fact_gadget_2009/the_egyptians/ancient_egypt/games_and_hunting/3071.html>,(undated) 1 page".

(Continued)

*Primary Examiner* — Laura Freedman
(74) *Attorney, Agent, or Firm* — Botos Churchill IP Law LLP

(57) ABSTRACT

Aspects of the disclosure relate to deployable structures, such as airbag systems, for vehicles. A system is disclosed for reducing likelihood of injury to a passenger in a collision. The system may include a seat configured to accommodate the passenger and an airbag system. At least a portion of the airbag system may be incorporated into a vehicle prior to deployment of the airbag system. The airbag system may include an airbag and a locking feature. The locking feature may be configured to lock the airbag with a locking portion of a vehicle when the airbag system has been deployed. The locking feature may be attached to the airbag. Aside from airbags, other confining structures, such as nets, shades, curtains, etc., may also be used as deployable structures.

22 Claims, 28 Drawing Sheets

(51) Int. Cl.
  *B60R 21/231* (2011.01)
  *B60R 21/0136* (2006.01)
  *B60R 21/06* (2006.01)
  *B60R 21/214* (2011.01)
  *B60R 21/16* (2006.01)
  *B60R 21/0134* (2006.01)

(52) U.S. Cl.
  CPC ............ *B60R 21/06* (2013.01); *B60R 21/214* (2013.01); *B60R 21/231* (2013.01); *B60R 21/2334* (2013.01); *B60R 2021/161* (2013.01); *B60R 2021/23107* (2013.01); *B60R 2021/23161* (2013.01)

(58) Field of Classification Search
  CPC .............. B60R 21/231; B60R 21/2334; B60R 2021/161; B60R 2021/23107; B60R 2021/23146; B60R 2021/23161
  See application file for complete search history.

(56) References Cited

U.S. PATENT DOCUMENTS

| | | | |
|---|---|---|---|
| 5,464,246 A | 11/1995 | Castro et al. | |
| 6,270,435 B1 | 8/2001 | Sodaro | |
| 6,474,681 B2 | 11/2002 | Peer et al. | |
| 7,971,900 B2* | 7/2011 | Lim | B60R 21/207 280/730.2 |
| 8,398,510 B1 | 3/2013 | Mizek et al. | |
| 9,333,934 B2 | 5/2016 | Sitko | |
| 9,604,588 B1 | 3/2017 | Rao et al. | |
| 9,725,064 B1 | 8/2017 | Faruque et al. | |
| 9,744,932 B1 | 8/2017 | Faruque et al. | |
| 9,789,840 B2 | 10/2017 | Farooq et al. | |
| 10,023,145 B1* | 7/2018 | Rivera | B60R 21/06 |
| 10,300,880 B2* | 5/2019 | Mihm | B60R 21/2334 |
| 2017/0072891 A1 | 3/2017 | Paxton et al. | |
| 2017/0144620 A1 | 5/2017 | Rao et al. | |
| 2017/0144621 A1 | 5/2017 | Rao et al. | |
| 2017/0197575 A1 | 7/2017 | Soules | |
| 2017/0210322 A1 | 7/2017 | Rao et al. | |
| 2017/0210329 A1 | 7/2017 | Rao et al. | |
| 2017/0217351 A1 | 8/2017 | Jaradi et al. | |

OTHER PUBLICATIONS

"Harpoon-Design, About The History of Whaling, Jonas Blondal [online] [retrieved Jul. 21, 2016]. Retrieved from the Internet: <http://www.jonas-blondal.de/uk/wl_01.html>, (undated) 3 pages".

"Steel Ferrule Archery Arrow Hypodermic Broadheads Tip Arrowhead Hunting Accessories [online] [retrieved Jul. 21, 2016]. Retrieved from the Internet<http://www.dhgate.com/product/24pcs-lot-100-grain-steel-ferrule-archery/213436427.html> (Jul. 21, 2016) 4 pages".

"Mach Spear Head—Cressi, Azzi Sport Marine [online] [retrieved Jul. 21, 2016]. Retrieved from the Internet<http://www.azzisport.com/Mach-spear-Head>, (Jul. 21, 2016) 7 pages".

"SEAC Single Barb Harpoon with Twin Wings, Blue Water Sports [online] [retrieved Jul. 21, 2016]. Retrieved from the Internet<http://www.bluewatersports.com/shop/seac-single-barb-harpoon-with-twin-wings.html> ,(Jul. 21, 2016) 1 page".

* cited by examiner

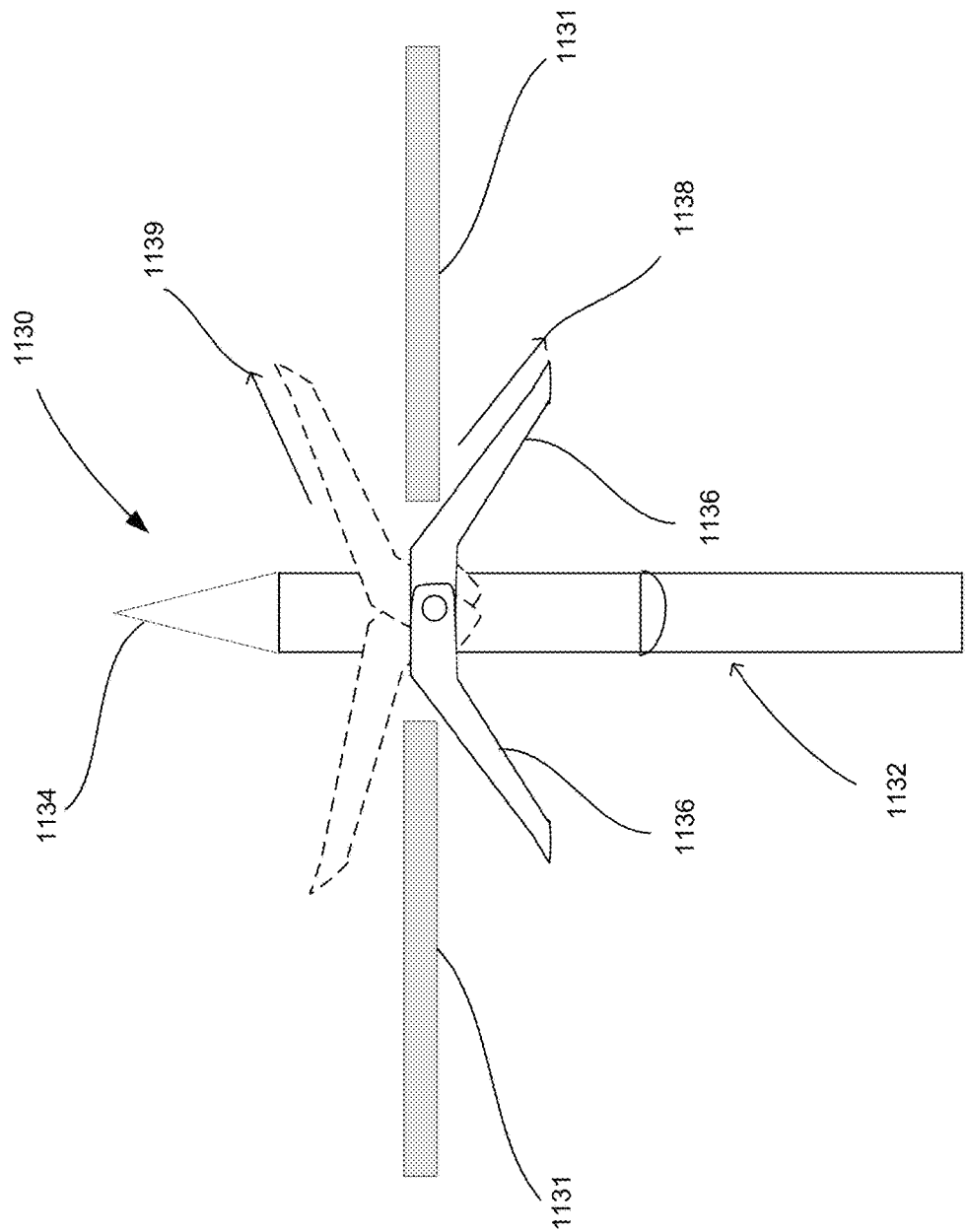

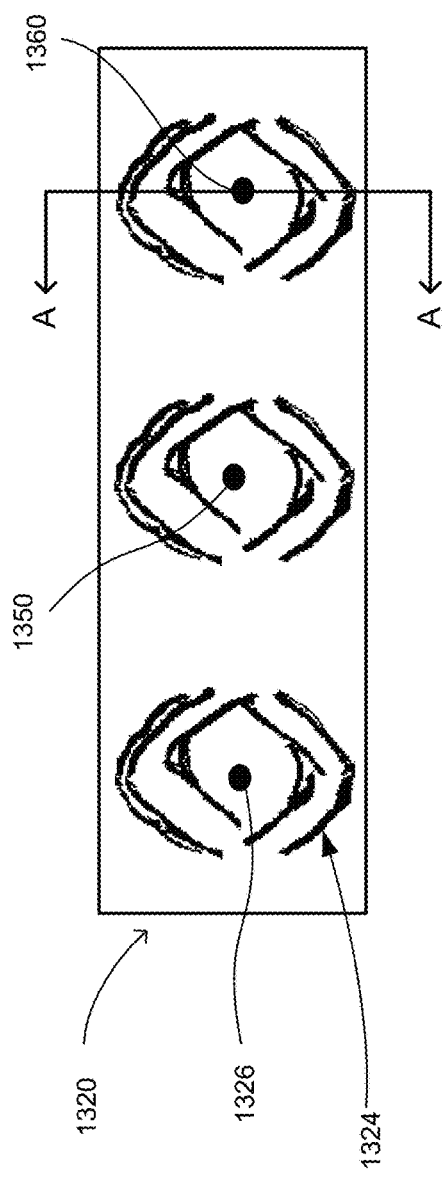
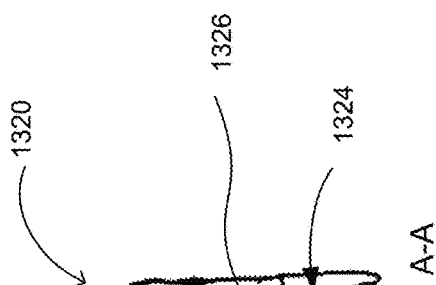
FIGURE 13B
FIGURE 13C
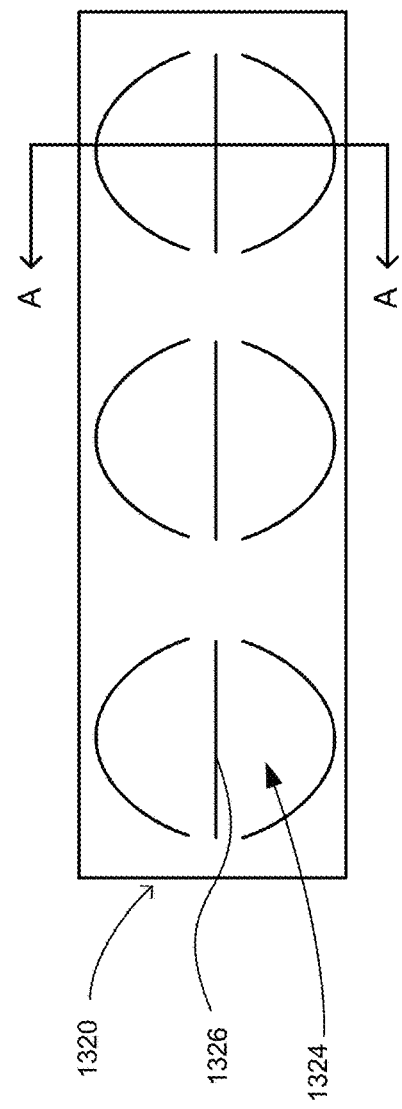
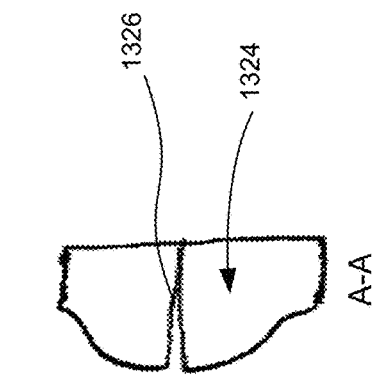
FIGURE 13D
FIGURE 13E

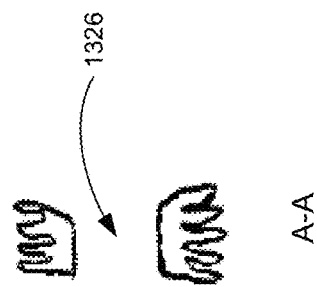
FIGURE 13G
FIGURE 13I
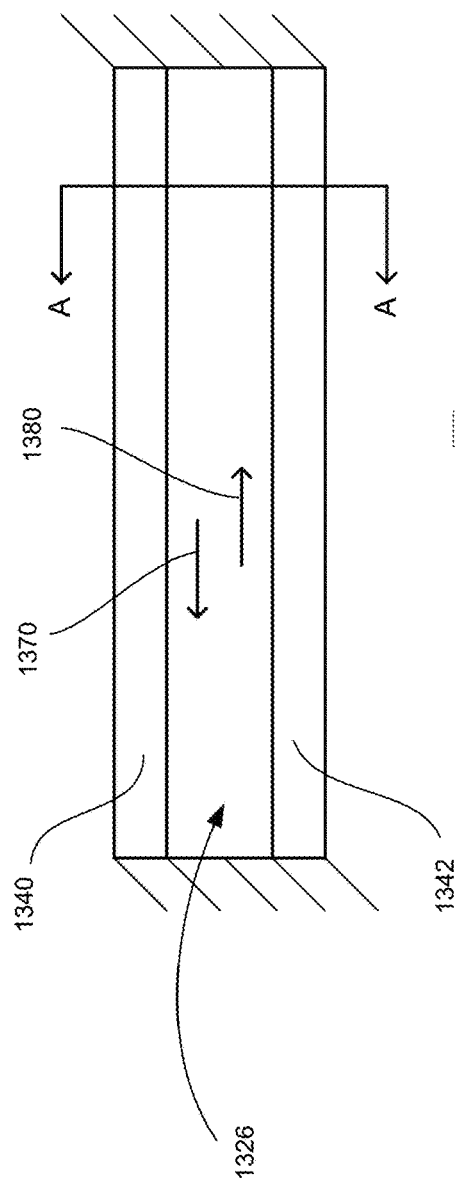
FIGURE 13F
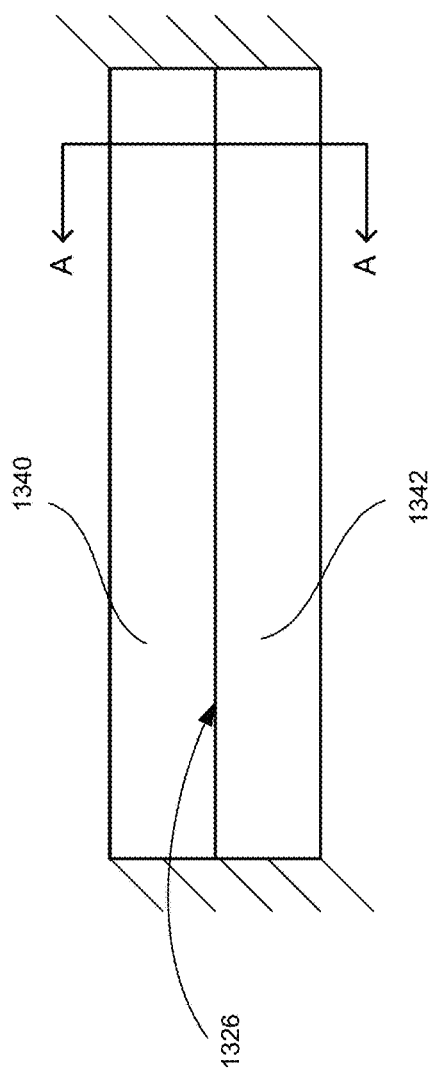
FIGURE 13H

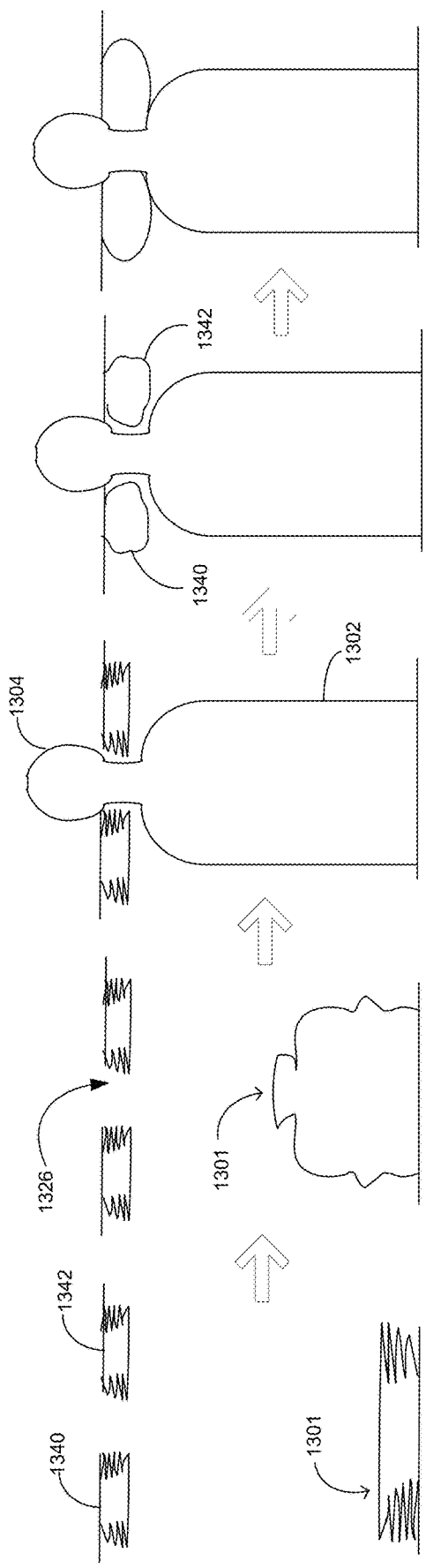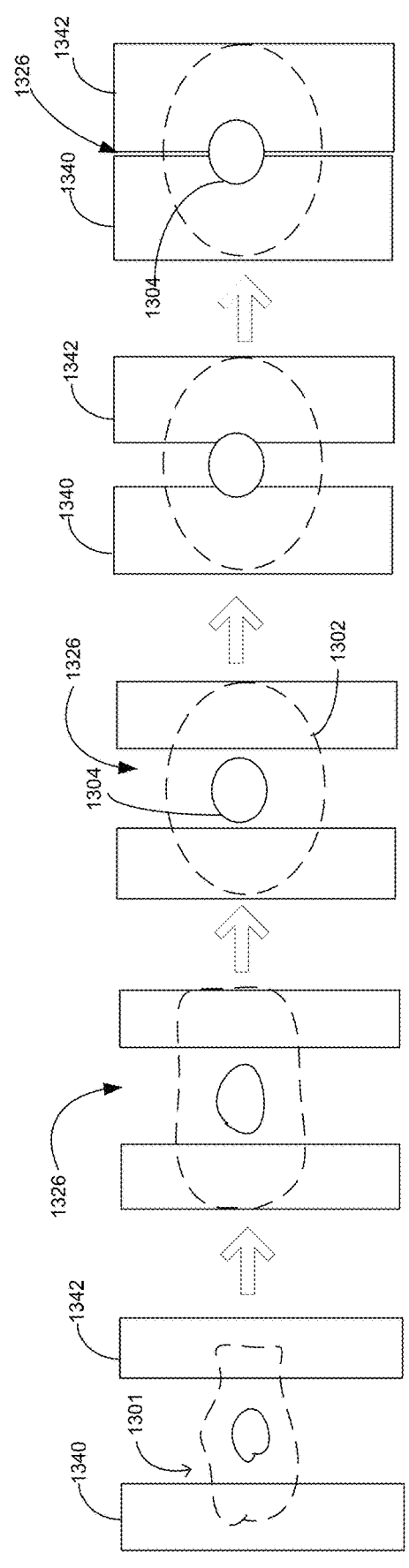

DEPLOYABLE PASSENGER ENCLOSURE

CROSS-REFERENCE TO RELATED APPLICATIONS

The present application is a continuation of U.S. patent application Ser. No. 15/228,328, filed Aug. 4, 2016, which issued as U.S. Pat. No. 10,023,145 on Jul. 17, 2018, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decided when to speed up, slow down, stop, turn, etc. These decisions are used to maneuver between locations but also to interact with and avoid collisions with other objects along the way.

When a collision actually occurs, non-autonomous and autonomous vehicles alike may include various safety mechanisms to reduce injury to passengers. Typically, the safety mechanisms may include airbag systems employed to protect passengers from impacts with the interior of a vehicle after an object external to a vehicle has impacted the vehicle.

BRIEF SUMMARY

This technology relates to a system for reducing likelihood of injury to a passenger in a collision. In one embodiment, the system may comprise a seat configured to accommodate the passenger and an airbag system. At least a portion of the airbag system may be incorporated into a portion of a vehicle prior to deployment of the airbag system. The airbag system may include an airbag and a locking feature. The locking feature may be configured to lock the airbag with a locking portion of the vehicle when the airbag system has been deployed. The locking feature may be attached to the airbag.

In some embodiments, the system may further comprise the vehicle and the locking portion. The locking portion may be incorporated into a structure of the vehicle. In some cases, the locking portion may be configured to move relative to the structure of the vehicle prior to deployment of the airbag system. In some versions, the locking portion may be configured to rotate relative to the structure of the vehicle prior to deployment of the airbag system. In some cases, the locking portion may be configured to rotate in correspondence with rotation of the seat prior to deployment of the airbag system. In some versions, the locking portion may be configured to translate relative to the structure of the vehicle in correspondence with a translation movement of the seat prior to deployment of the airbag system.

In one embodiment, the locking feature may include a ball pin projection. The ball pin projection may be configured to lock with the locking portion when the airbag system has been deployed. In some versions, the system may further comprise the vehicle and the locking portion. The locking portion may include a one way hinge lock incorporated into a headliner of the vehicle.

In another embodiment, the locking feature may include a magnet. The magnet may be configured to lock with the locking portion when the airbag system has been deployed. In some versions, the system may further comprise the vehicle and the locking portion. The locking portion may include a magnet incorporated into a headliner of the vehicle.

In some embodiments, the locking feature may include a piercing lock. In other embodiments, the locking feature may include a one way snap.

In some embodiment, the system may further comprise the vehicle and a second seat. A second portion of the airbag system may be incorporated into the second seat. The second seat may be oriented towards the seat in the vehicle. The second portion and the first portion may be configured to form a partial enclosure around the seat when the airbag system has been deployed in order to reduce the likelihood of injury to the passenger when the passenger is in the seat.

Another aspect of the disclosure provides a method for reducing likelihood of injury to a passenger in a collision. The method may include selecting an airbag system for deployment. The airbag system may have at least a portion incorporated into a vehicle prior to deployment of the airbag system. A seat may be configured to accommodate the passenger. The airbag system may include an airbag and a locking feature attached to the airbag. The method may include deploying the airbag system by inflating the airbag. The method may include interlocking the locking feature with a one-way hinge lock incorporated into a structure of the vehicle. The interlocking may include sliding an end portion of the locking feature through a first side of the one-way hinge lock until the end portion passes through the one-way hinge lock. The interlocking may include engaging a surface of the end portion with a second side of the one-way hinge lock. The first side and second side may be opposing sides of the one-way hinge lock.

In some embodiments, the method may further include, prior to deploying the airbag system, positioning the one way hinge lock to facilitate the interlocking by rotating the one way hinge lock relative to the structure of the vehicle in correspondence with the rotation of the seat. In other versions, the method may further include, prior to deploying the airbag system, positioning the one way hinge lock to facilitate the interlocking by translating the one way hinge lock relative to the structure of the vehicle in correspondence with a translation movement of the seat.

In some versions, inflating the airbag and the interlocking may take place prior to the collision. In other versions, inflating the airbag takes place in response to the collision.

In some embodiments, selection of the airbag for deployment may be based on the position of the passenger relative to the vehicle.

In one embodiment, a second portion of the airbag system may include a second airbag incorporated into a second seat prior to deployment of the airbag system. The second seat may be oriented towards the seat in the vehicle. Deploying the airbag system may cause the airbag and the second airbag to form a partial enclosure around the seat in order to reduce the likelihood of injury to the passenger.

BRIEF DESCRIPTION OF THE DRAWINGS

FIGS. 11A-11C are examples of a locking portion and locking feature in accordance with aspects of the disclosure.

DETAILED DESCRIPTION

Overview

Figure 1:
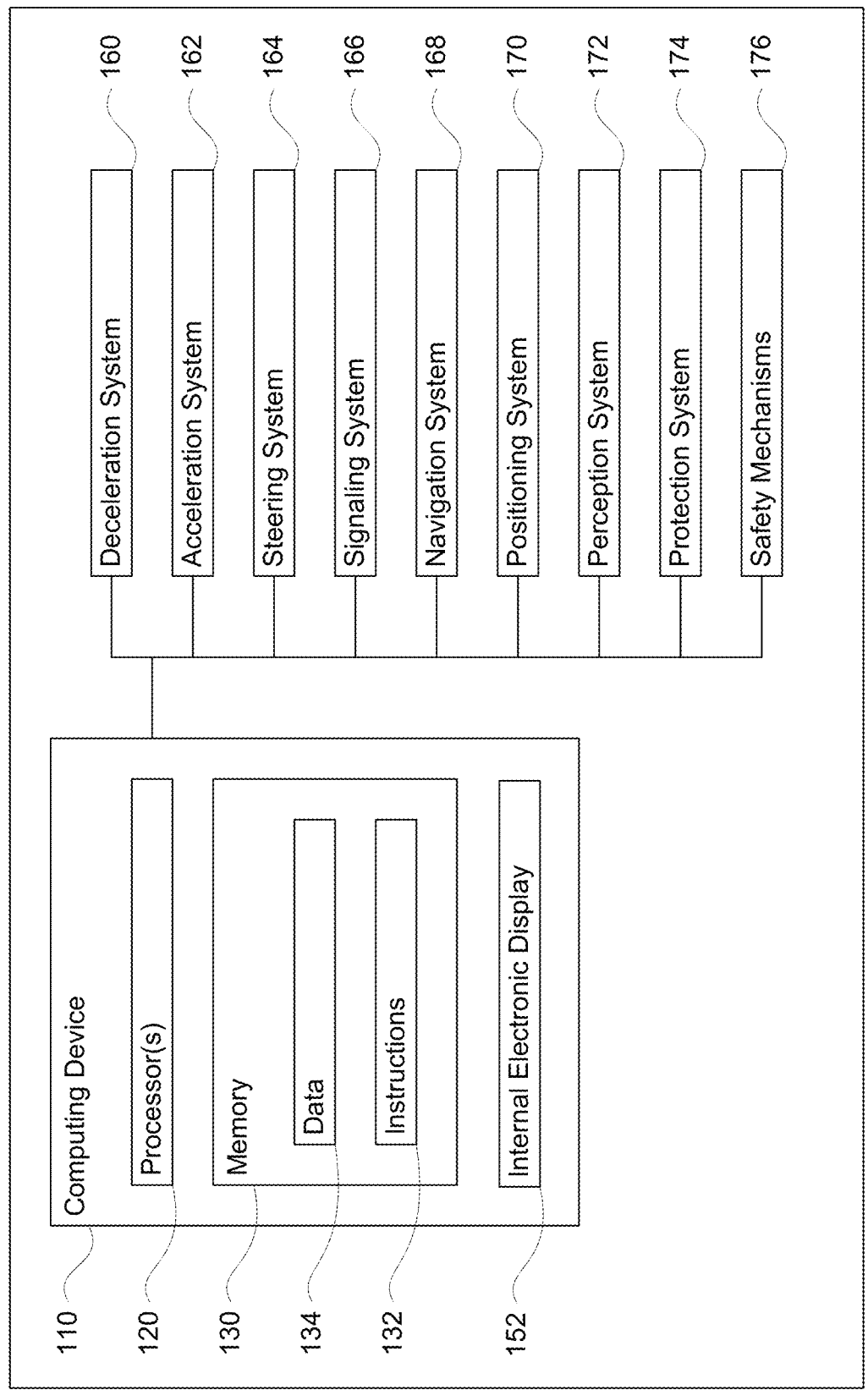
FIG. 1 is a functional diagram of an example vehicle in accordance with aspects of the disclosure.
Figure 2A:
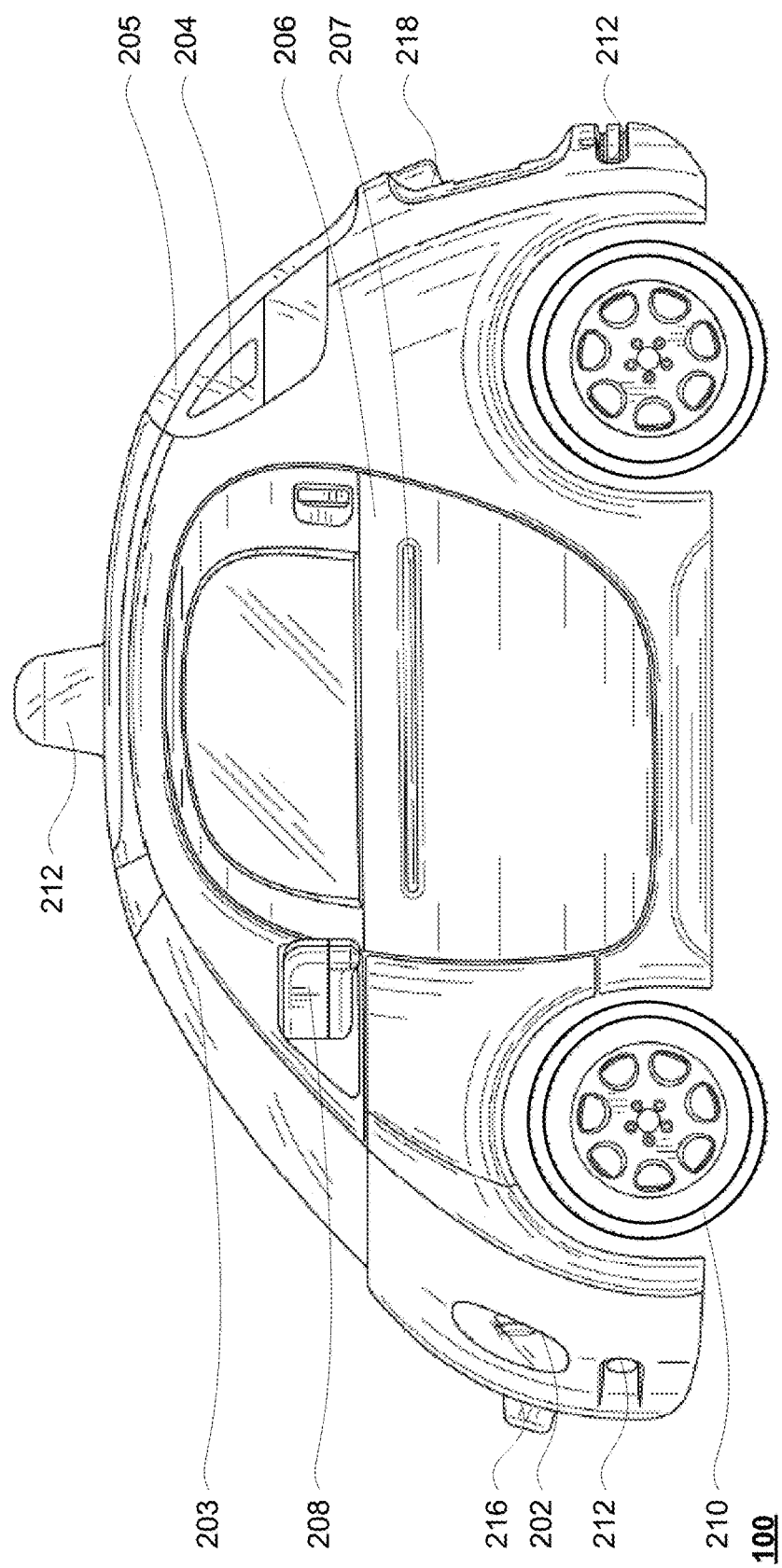
FIGS. 2A-2D are example external views of a vehicle in accordance with aspects of the disclosure.
Figure 2C:
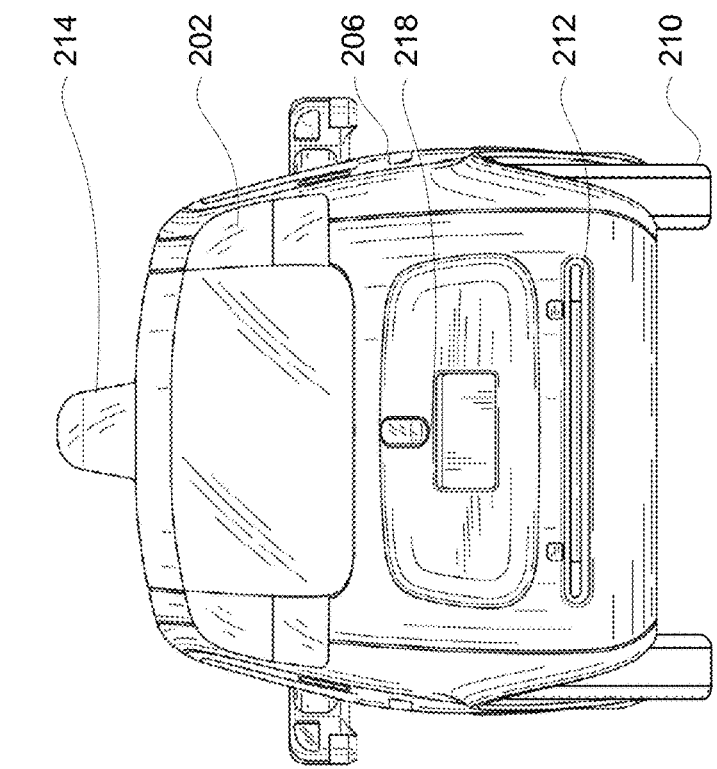
Figure 2B:
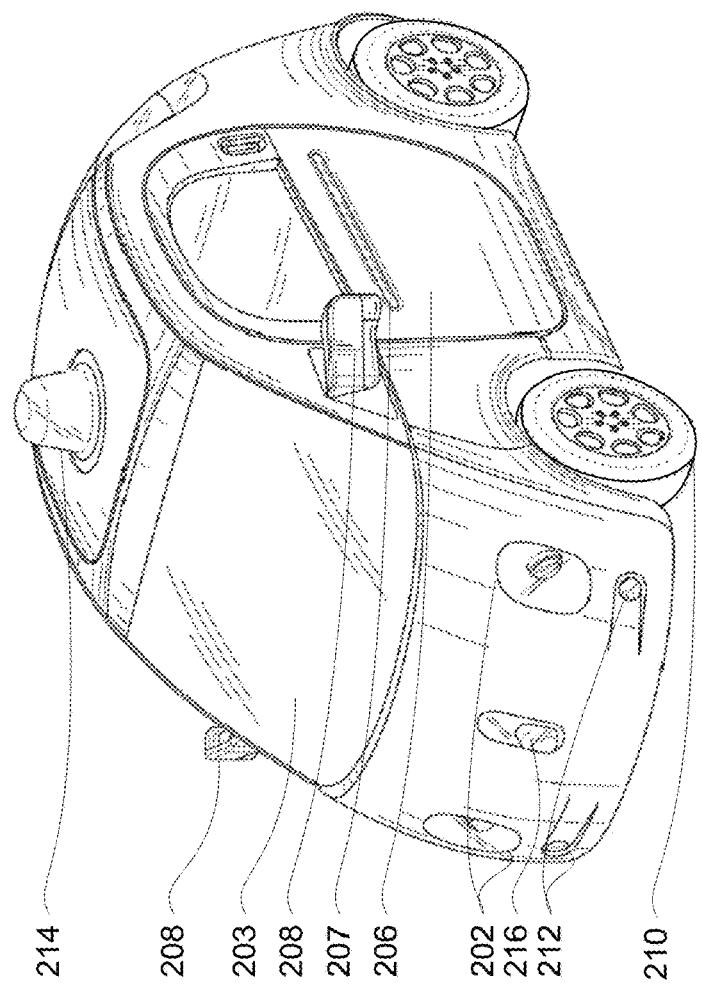
Figure 2D:
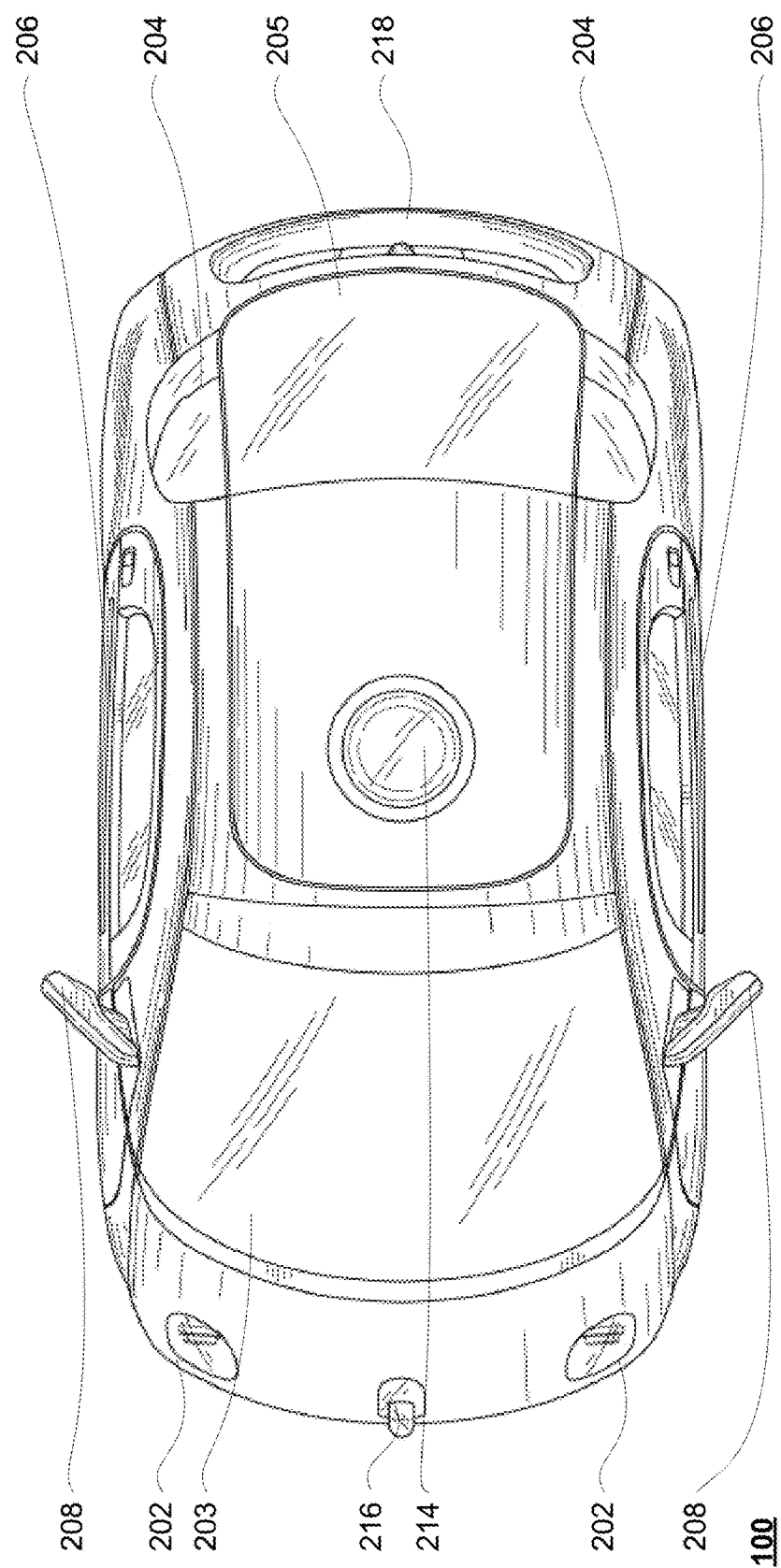

This technology relates to deployable structures including vehicle airbags used to protect passengers in the event of a collision. For instance, traditional airbags may be direction specific and may protect passengers when they are seated in a few predetermined positions that are considered to be "standard" positions, such as in a forward facing position with a passenger's back against the seat, feet touching the ground, etc. Sometimes, side curtain airbags are also used; however, these airbags may protect only the head of an passenger, and not the rest of the passenger's body. When a passenger sits in a non-standard position, or a vehicle includes non-standard seating configuration, such as in an autonomous vehicle, traditional airbags may not be sufficient to effectively protect a passenger in the event of a collision.

In order to more fully protect passengers in non-standard seating positions, an airbag system, including one or more in-seat airbags, may be used. Airbags may be deployed from front, rear, and/or sides of a passenger, creating columns or at least a partial enclosure around the passenger. Prior to deployment, airbags may be stored in various locations within a vehicle. For the front of the seat, the vehicle floor may be used for airbag storage. This configuration may allow for better storage of airbag packages with high volume. In a face-to-face seating configuration, the front airbags may be stored within the opposite seat. In such an instance, airbags may be deployed from the opposite seat if that seat is not occupied by another passenger.

As with typical airbags, each of the airbags may include its own deployment mechanism which can be triggered by an electronic signal from one or more of the computing devices of the autonomous vehicle. This signal may trigger ignition of a gas generator propellant to rapidly inflate the airbag. Each airbag may also have its own vent to control the flow of gas out of the airbag after deployment.

The airbag system may include a locking feature configured to interlock the airbags that form the enclosure with a locking portion of the vehicle. The locking portion may be a part of or incorporated into a structure of the vehicle.

The location of the locking portion may be fixed or adjustable. An adjustable locking portion may include linear tracks or linear actuators on the headliner or other roof structure. The locking portion may include rotating motors. The motor may rotate the locking portion in correspondence with any rotation of seats. In this regard, the locking feature may always align with seat and/or passenger.

The locking feature may include any number of different configurations. The locking feature may be secured through detachable or breakable connectors. The locking portion may include one or more one-way hinge locks. The locking feature may further include a ball pin projection attached to an airbag of the airbag system. The ball pin projection may have a ball, barb, or other shape larger in diameter than the pin portion of the projection.

Deployment of the airbag system may be done selectively. Deployment may occur in response to a collision or in anticipation of collision based on information from sensors of the vehicle that detect and identify objects in the vehicle's external environment. To deploy the airbag system, a vehicle's computing devices may use information from the vehicle's sensors to identify and track objects in the vehicle's environment. The vehicle's computing devices may use the characteristics of the object to predict trajectories or future locations where the object and also the vehicle will be. The vehicle's computing devices may also determine whether the future locations indicate that the vehicle will collide with the object (and also approximately where and when). If a collision is likely, the vehicle's computing devices may maneuver the vehicle in order to avoid the object. However if there is not enough time to avoid the object, the vehicle's computing devices may determine that an impact with the object is imminent.

In addition, once an impact is determined to be imminent, specific airbags may deploy based upon information from various internal sensors which detect an passenger's position within the vehicle, whether passenger is in safety feature, whether passenger is in standard or non-standard position, position of surrounding objects, etc. Based on monitored position, the computing devices may decide which airbag systems of the vehicle to deploy.

Once the computing devices have determined to deploy the airbag system, a signal from the computing devices may trigger ignition of a gas generator propellant to rapidly inflate the airbag. A signal from the computing devices may also position the locking portion to align with the locking feature of the airbag system to be deployed. The airbag may be deployed and interlock with vehicle structure at the locking portion using a locking feature as described above. After deployment, one end of the ball pin projection may slide through a first side of the one-way hinge locks. After the ball fully passes through the one way hinge locks, the surface of the ball may engage with a second side of the one-way hinge lock to remain securely in place.

The features described herein may allow for protection of a passenger in a non-standard position in the event of a collision. When a vehicle includes non-standard seating configuration or when a passenger sits in a non-standard position, features of the deployable enclosure described herein may be used to effectively protect a passenger. The deployable enclosure system may more comprehensively encapsulate passenger in a soft barrier than traditional airbag systems and thereby prevent hard objects from hitting passenger.

In addition, as discussed in detail below, the features described herein allow for various alternatives.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, data 132 and instructions 134.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 170 may include lasers, sonar, radar, cameras and/or any other detection devices that record data which may be processed by computing device 110. In the case where the vehicle is a small passenger vehicle such as a car, the car may include a laser 214 (shown in FIGS. 2A-2D) or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 202, and turn signal/parking lights 212 may be associated the signaling system 166. Light bar 207 may also be associated with the signaling system 166.

Figure 3:
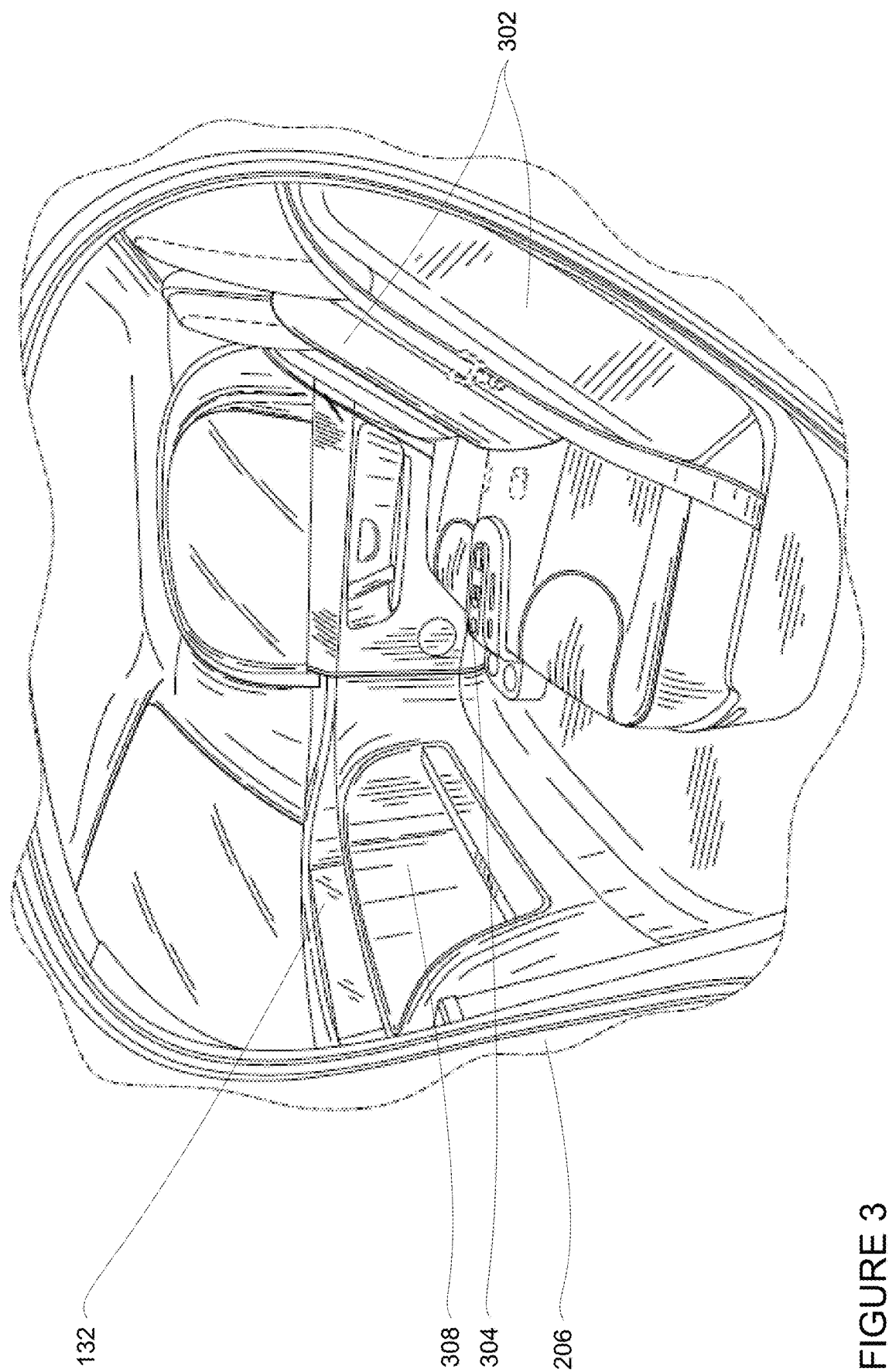
FIG. 3 is an example internal view of a vehicle in accordance with aspects of the disclosure.

FIG. 3 is an example internal view of vehicle through the opening of door 206. In this example, there is of a row of two seats 302 for passengers with a console 304 between them. Directly in ahead of seats 302 is a dashboard configuration 306 having a storage bin area 308 and the internal electronic display 152. As can be readily seen, the vehicle does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, user input is limited to a microphone of the user input 150 (not shown), features of the console 304, and wireless network connections. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

These sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

As discussed in more detail below, information from the perception system may be sent to various other systems in order to make decisions about when and how to deploy various safety mechanisms. In this regard, the perception system may send the information to the vehicle's computing devices which make such decisions and forward activation instructions to protection system 174 which deploys one or more safety mechanisms 176 in accordance with the activation instructions. In another example, the perception system 172 may forward the information directly to the protection system 174 which makes then determines whether and how to deploy one or more safety mechanisms 176.

Thus, the vehicle may also include a plurality of safety mechanisms 176. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent.

Figure 4:
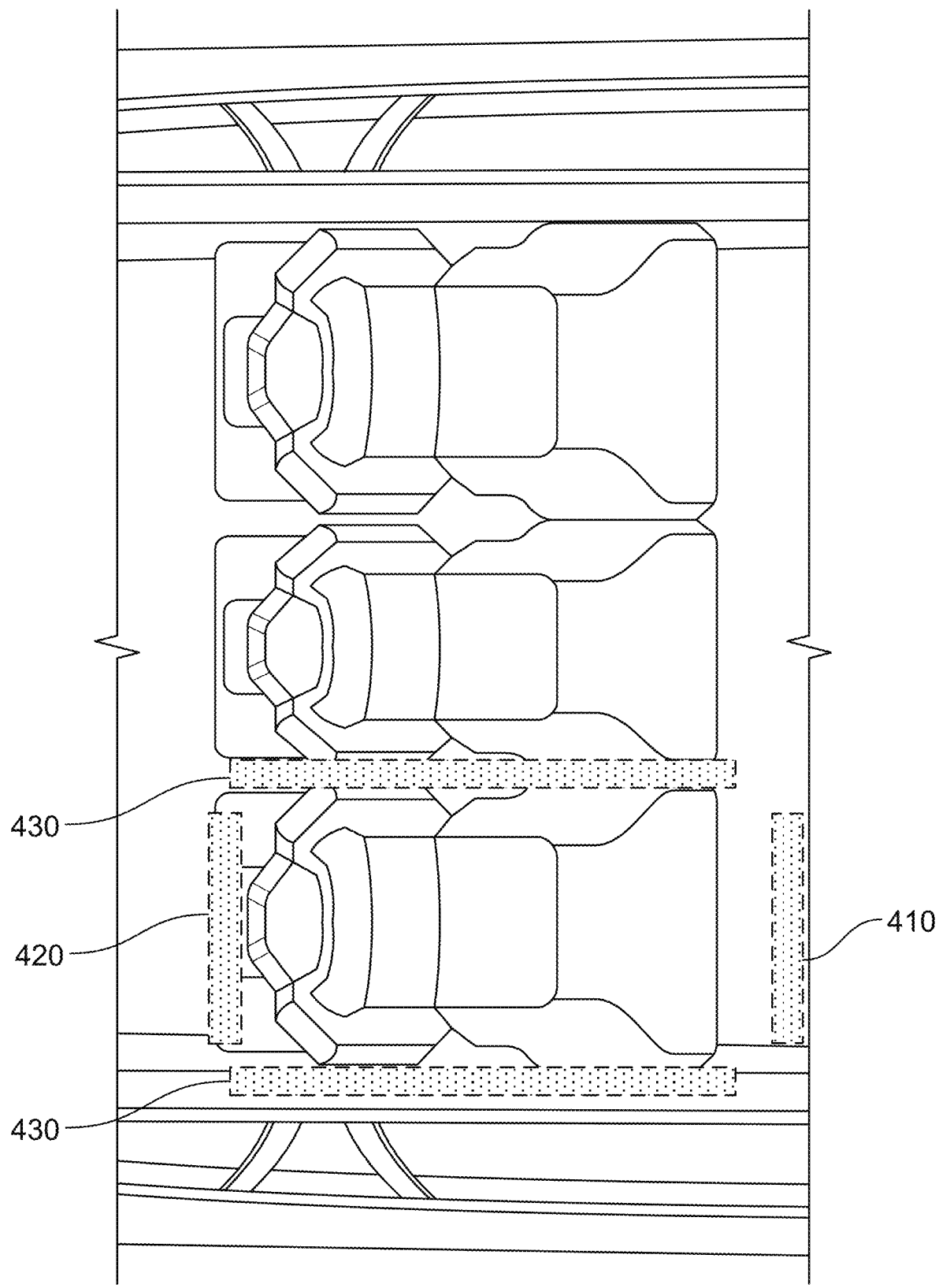
FIG. 4 is an example airbag system for a vehicle in accordance with aspects of the disclosure.

The one or more safety mechanisms 176 may include one or more airbag systems. In order to more fully protect passengers in non-standard seating positions, such as fully reclined, turned 45 degrees from vehicle forward detection, etc., an airbag system, including one or more in-seat airbags, may be used. For instance, as shown in FIG. 4, airbags may be deployed from the front 410, rear 420, and/or sides 430 of a passenger, creating columns or at least a partial enclosure around the passenger.

Figure 5:
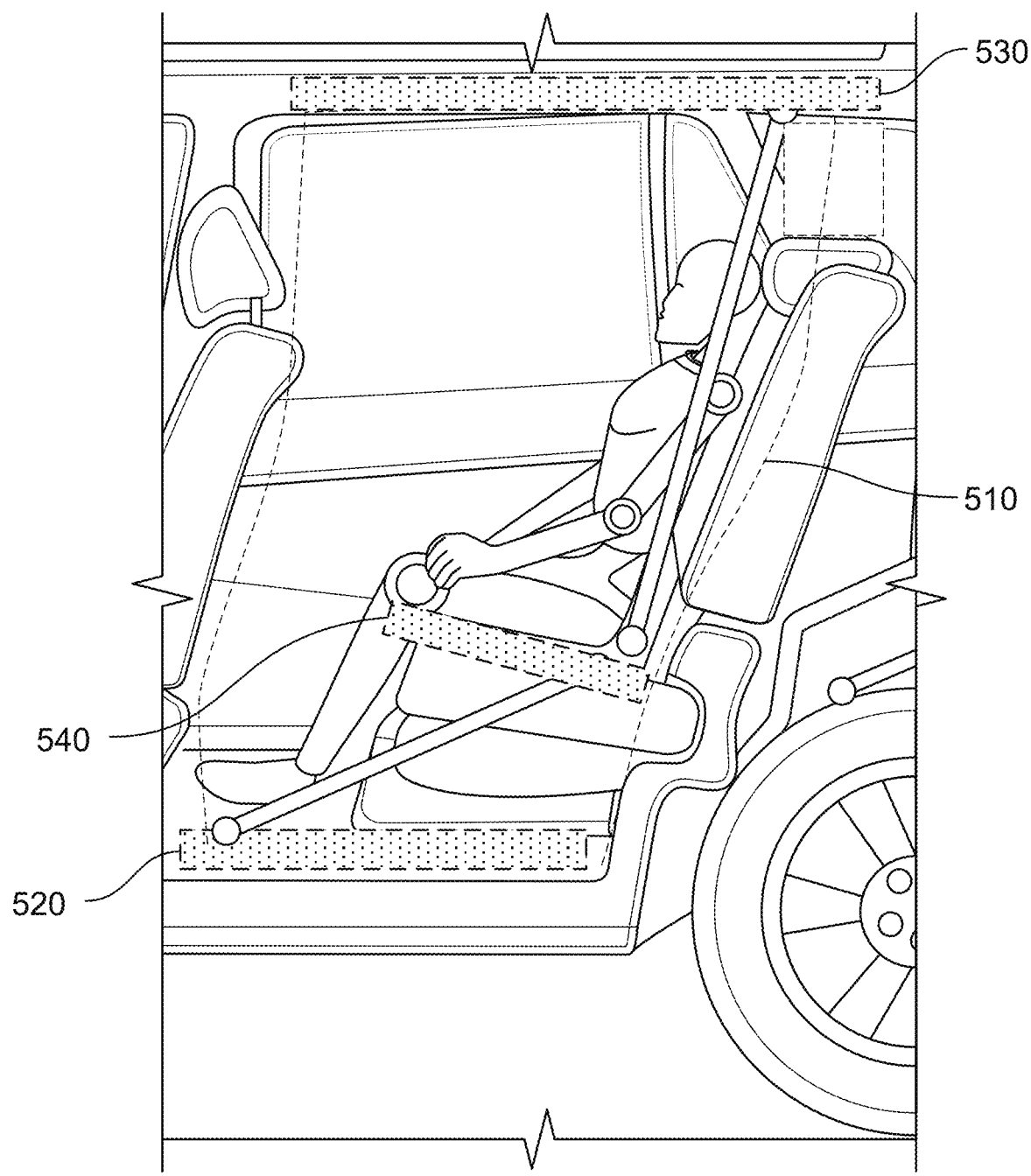
FIG. 5 is another example airbag system for a vehicle in accordance with aspects of the disclosure.
Figure 7:
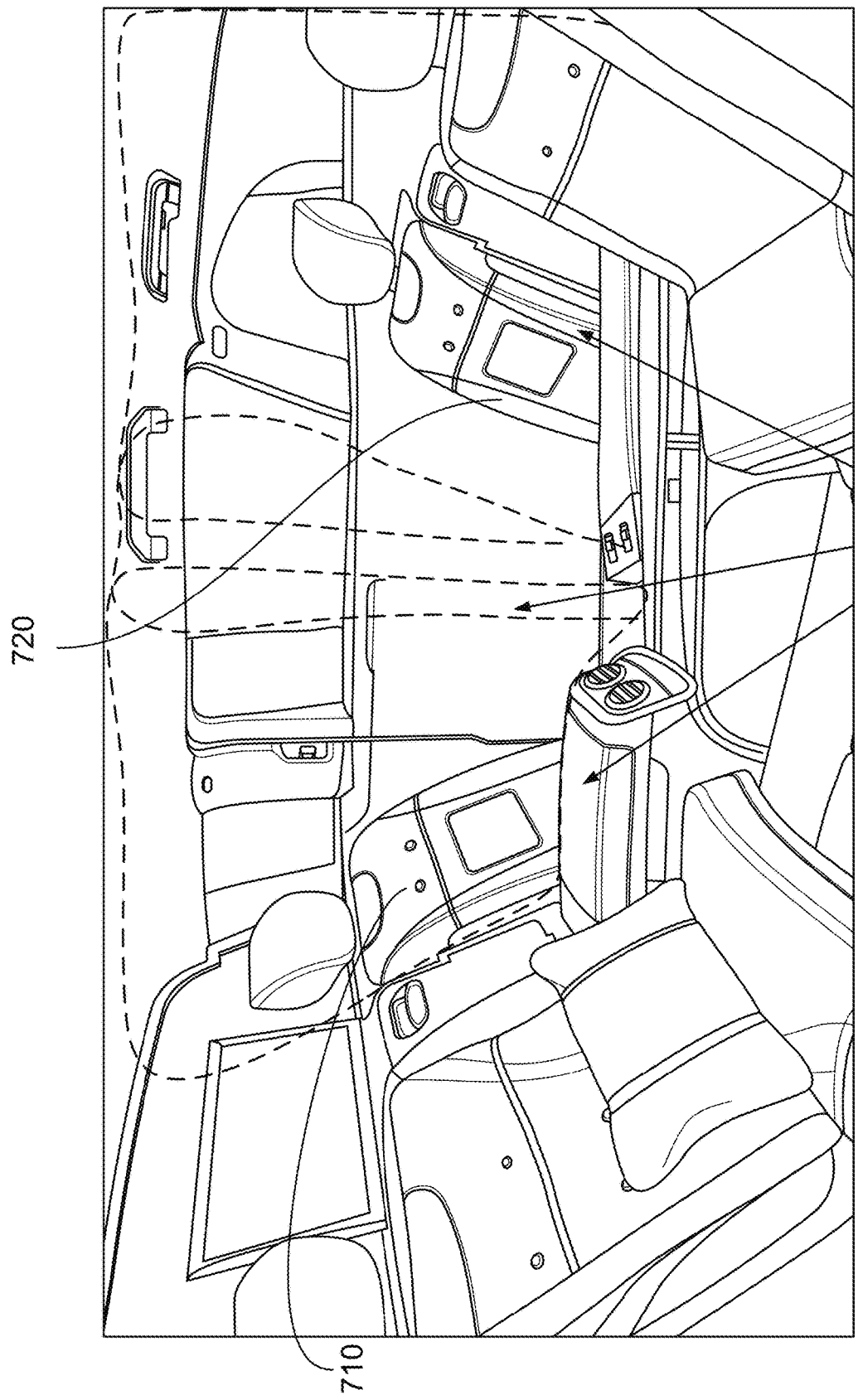
FIG. 7 is example seating configuration within a vehicle in accordance with aspects of the disclosure.

Prior to deployment, airbags may be stored in various locations within vehicle 100. Airbags may be stored behind seats, within the back of the seat, on the side portion of seats, in front of seats, within the door panel, and/or in the center console. By way of example and as shown in FIG. 5, for the front of the seat 510, the vehicle floor 520 may be used for airbag storage. This configuration may allow for better storage of airbag packages with high volume. In some embodiments, as shown in FIG. 5, vehicle's headliner or other roof structure 530 may be used to store the airbags. In another instance and as shown in FIG. 7, in a face-to-face seating configuration, the front airbags for seat 710 may be stored within the opposite seat 720. In such an instance, airbags may be deployed from the opposite seat 720 if the seat 720 is not occupied by another passenger.

As with typical airbags, each of the airbags may include its own deployment mechanism which can be triggered by an electronic signal from one or more of the computing devices of the autonomous vehicle. This signal may trigger ignition of a gas generator propellant to rapidly inflate the airbag. Each airbag may also have its own vent to control the flow of gas out of the airbag after deployment.

The airbag system may include a locking feature configured to interlock the airbags that form the enclosure with a locking portion of the vehicle. By way of example with reference to FIG. 5, the airbags that form the enclosure may lock into a locking portion. The locking portion may be a part of or incorporated into a structure of the vehicle, such as a headliner or other roof structure 530. In some embodiments, the locking portion may be a part of or incorporated into the floor of the vehicle or parts of the seats. For example, if an airbag is stored within the headliner or the roof structure 530, the vehicle's floor 520 and/or parts of the seat 510, such as side of the seat 540, may include one or more locking portions to interlock the airbag to the floor and/or seats. Further structural details of example locking portions are discussed below.

The location of the locking portion may be fixed or adjustable. For instance, an adjustable locking portion may include linear tracks or linear actuators on the headliner or other roof structure 530. The linear tracks or actuators may be located above or below the headliner or other roof structure 530. In one example, the locking portion may include an electric motor (not shown). The motor may rotate the locking portion in correspondence with any rotation of seats. In this regard, the orientation of the locking feature may always align with the orientation of the seat and/or passenger.

Figure 6A:
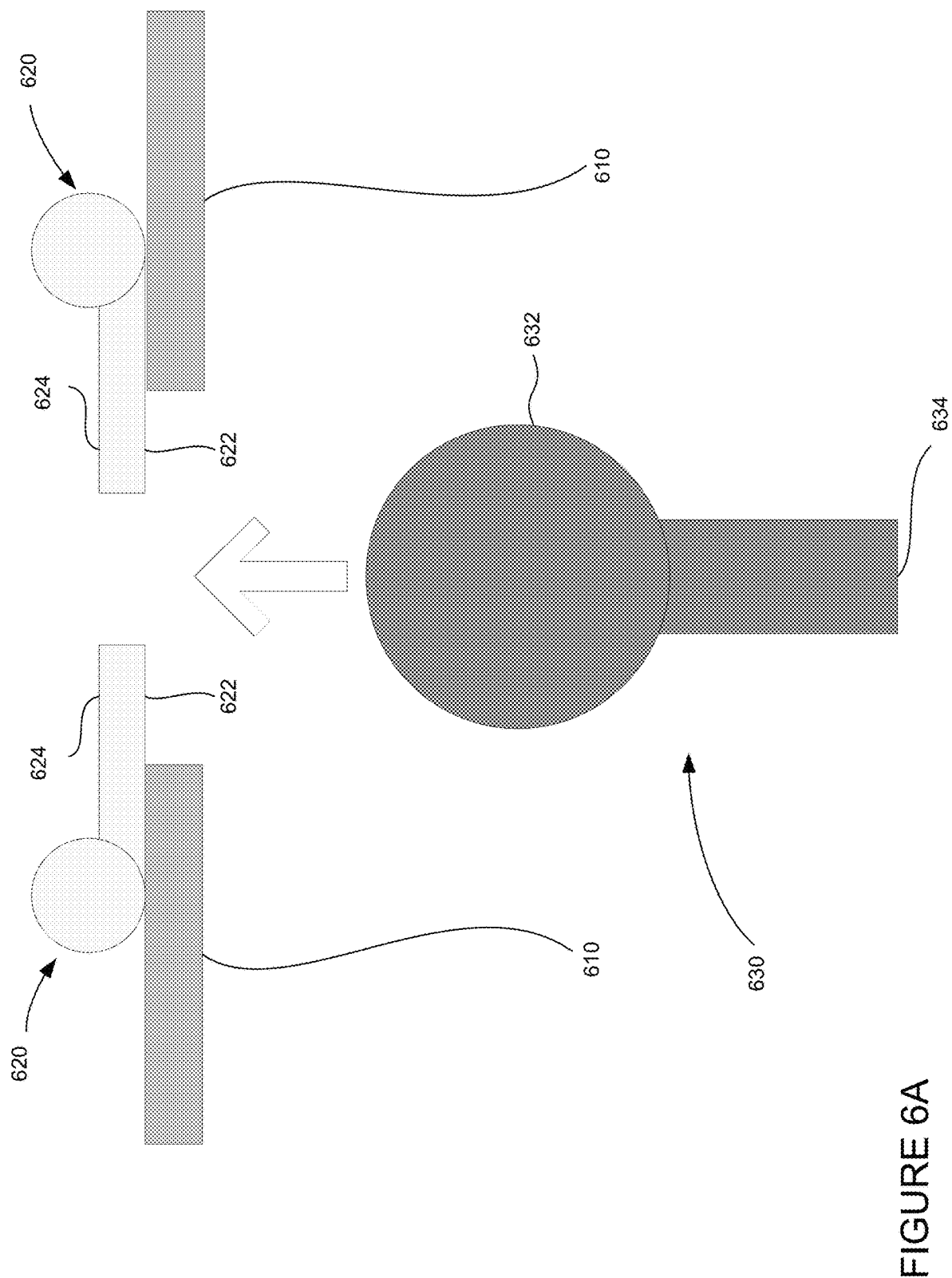
FIGS. 6A-6C are examples of a locking portion and locking feature in accordance with aspects of the disclosure.
Figure 6B:
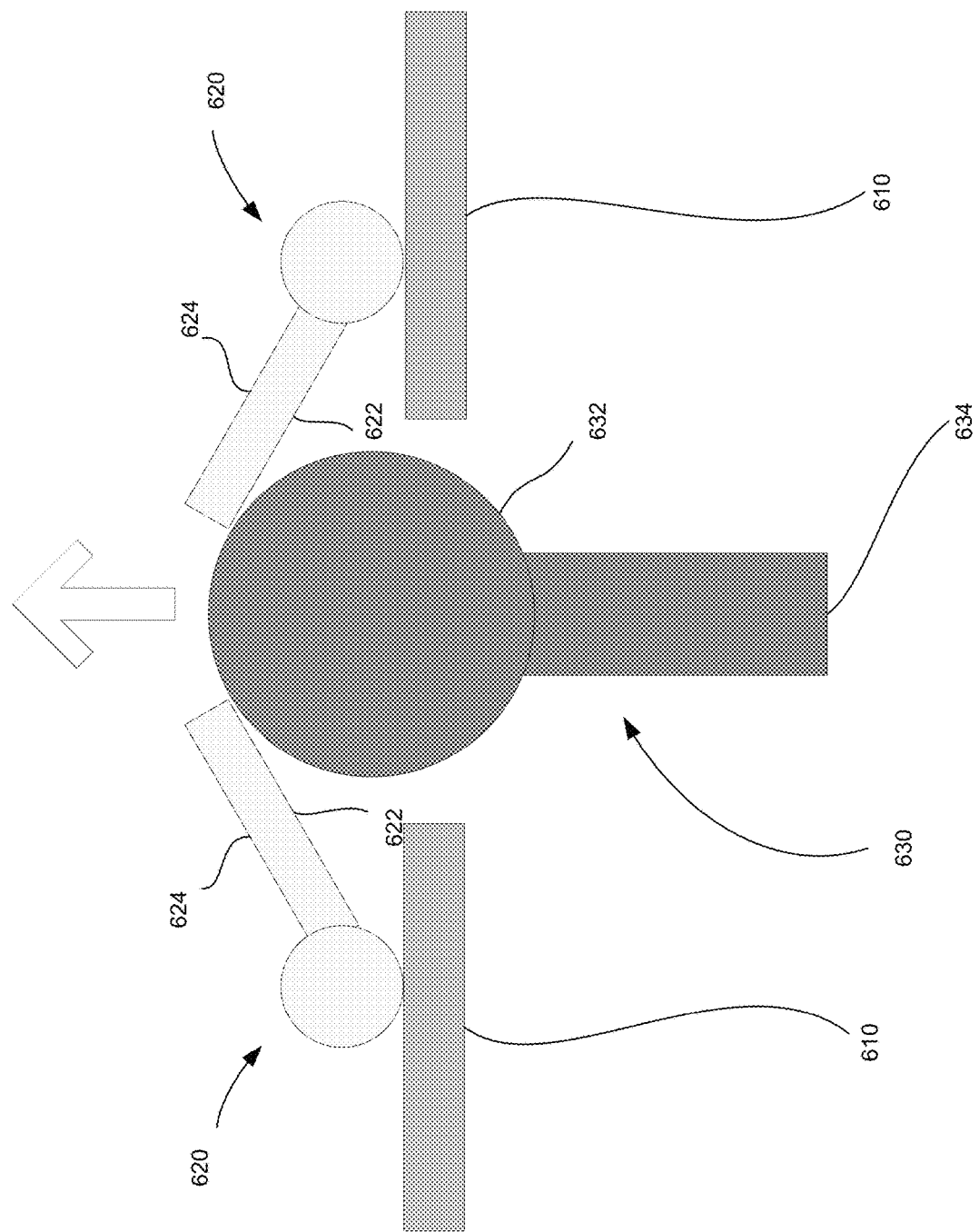
Figure 6C:
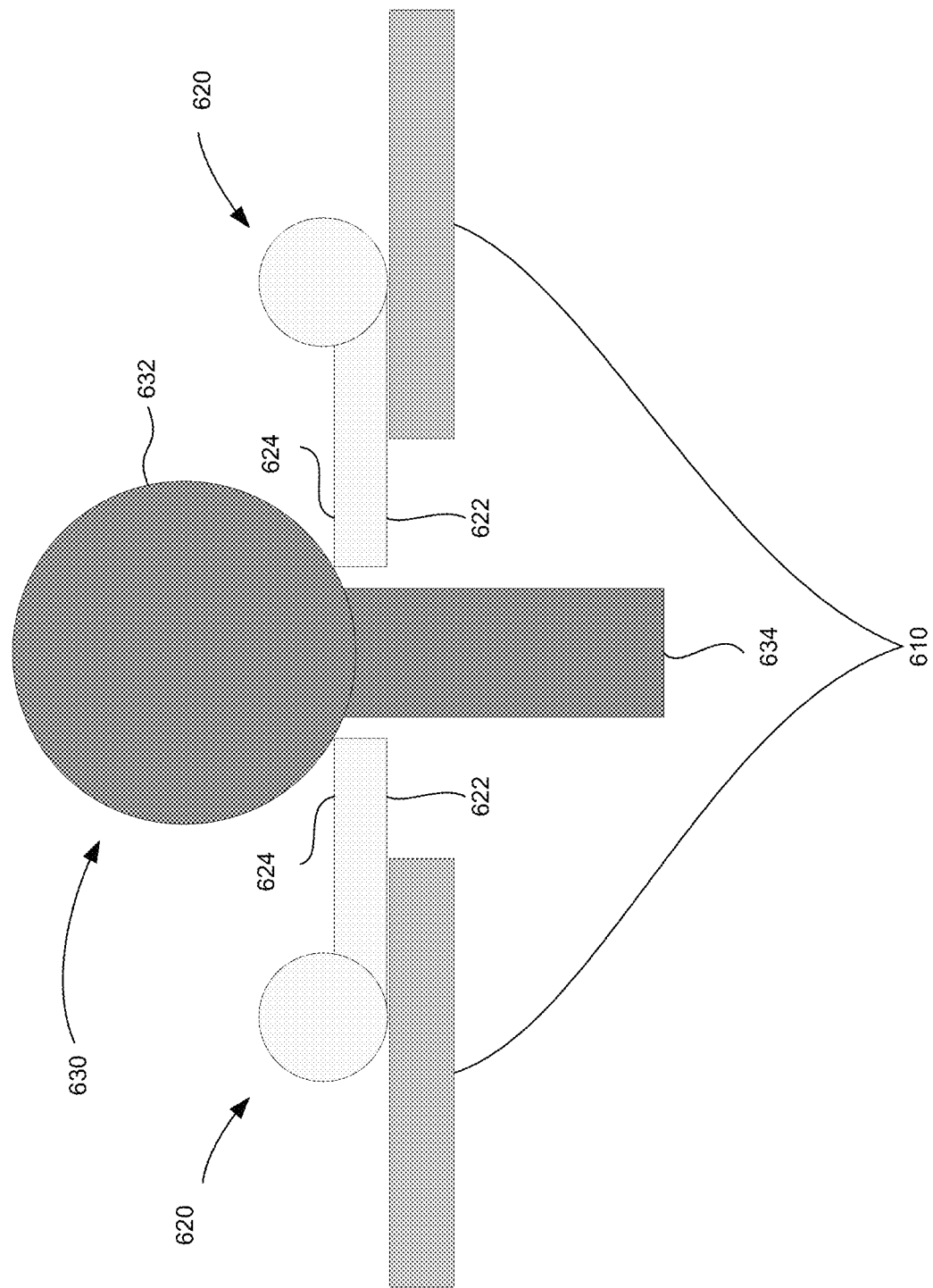

The locking feature may include any number of different configurations. For instance, the locking feature may be secured through detachable or breakable connectors, such as ball pins, magnets, or one way snaps. In one example, as shown in FIG. 6A-6C, locking portion 610 may include one or more one-way hinge locks 620. The locking feature may further include a ball pin projection 630 attached to an airbag of the airbag system. The ball pin projection 630 may have a ball, barb, or other shape 632 larger in diameter than the pin portion 634 of the ball pin projection 630.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
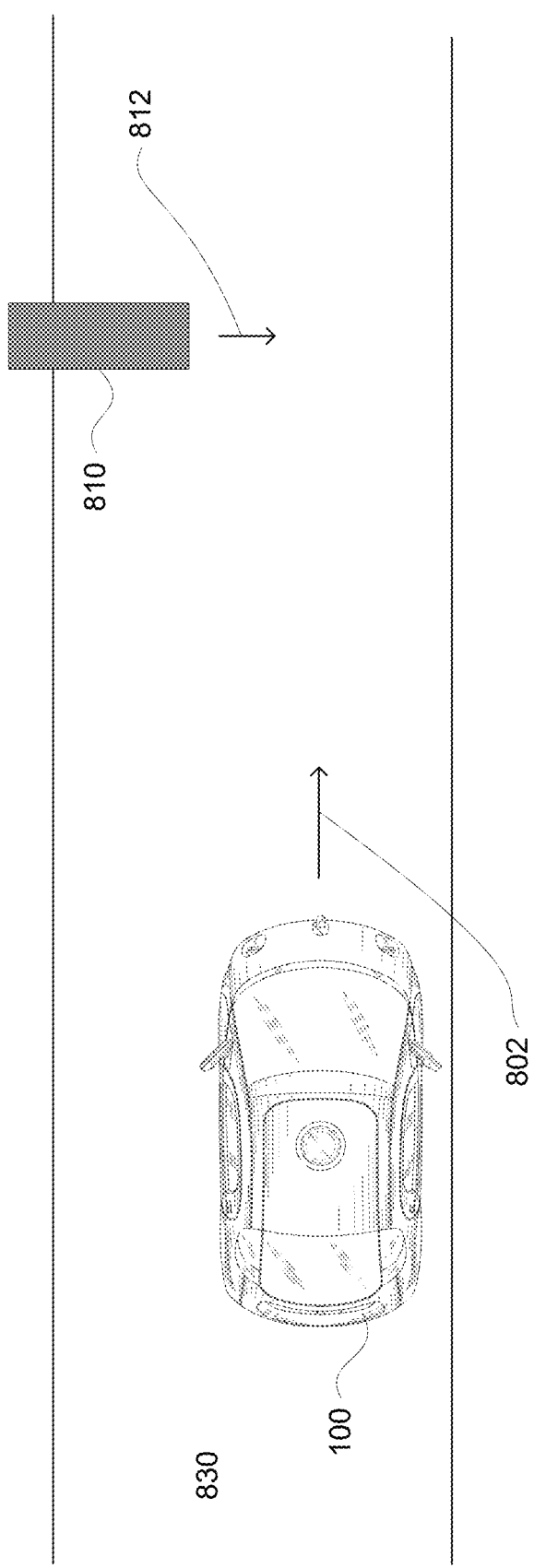
FIG. 8 is an example view of a vehicle on a roadway in accordance with aspects of the disclosure.

Deployment of the airbag system may be done selectively. For instance, deployment may occur in response to a collision or in anticipation of collision based on information from sensors of the vehicle that detect and identify objects in the vehicle's external environment. For example, to deploy the airbag system, vehicle's computing devices may use information from the vehicle's sensors to identify and track objects in the vehicle's environment. One or more computing devices of the perception system may use information from the vehicle's sensors to detect and identify the characteristics (size, speed, shape, direction, object type, etc.) of various objects in the vehicle's environment. FIG. 8 is an example 800 bird's eye view of vehicle 100 as it drives along roadway 830 in the direction of arrow 802. In this example, the one or more computing devices of the perception system 174 may identify, among other things, the location and object type of object 810. After a brief period of tracking this object, the perception system 174 may determine the speed and heading of object 810 as shown by arrow 812.

Figure 9:
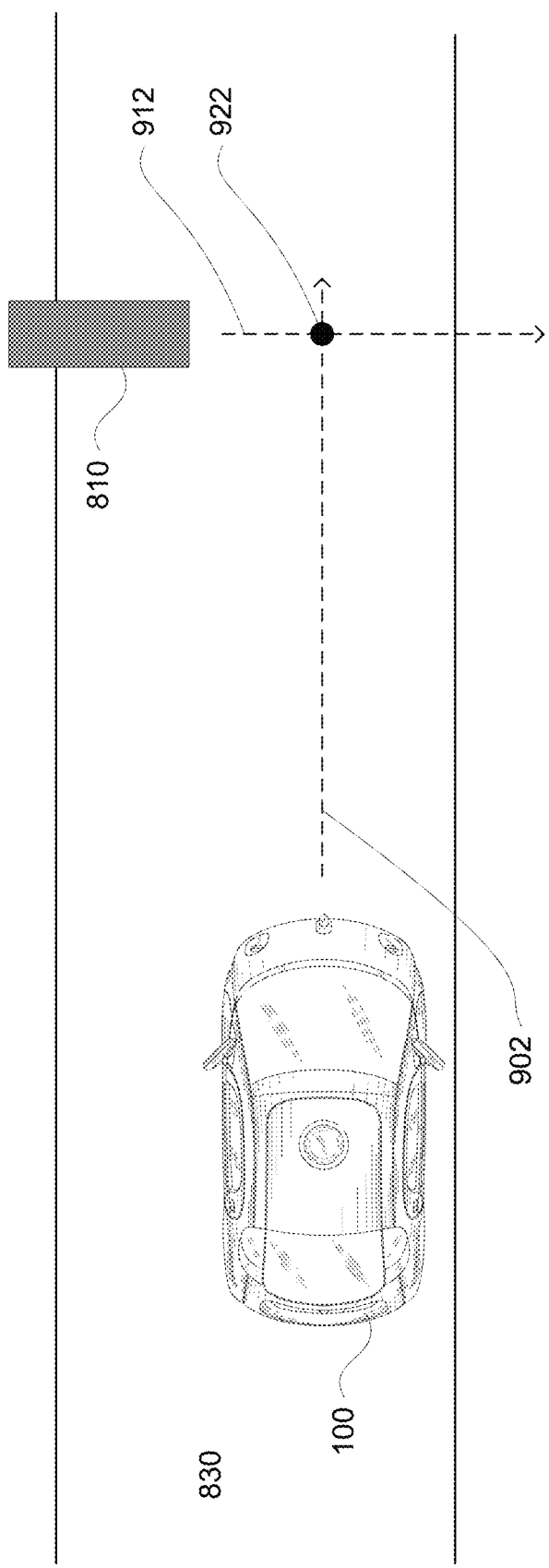
FIG. 9 is an example view of a vehicle on a roadway and data in accordance with aspects of the disclosure.

In addition, the vehicle's computing devices may use the characteristics of the object, such as speed and heading, to predict future locations where the object will be. For example, as shown in example 900 of FIG. 9, trajectory lines 902 and 912 represent predicted future locations of vehicle 100 and object 810. Because the predicted future locations of these objects are just that, a prediction, predictions may quickly become less accurate the farther into the future they extend.

The vehicle's computing devices may also determine whether the future locations indicate that the vehicle will collide with the object, and also approximately where and when. For example, the perception system 174 or computing device 110 may determine that an impact with object 810 is likely to occur at the locations of predicted impact point 922, respectively. Each of these impact points may be defined as a three-dimensional coordinate (X, Y, Z) in space such as latitude, longitude, and altitude or similar.

In most cases, if a collision is likely, the vehicle's computing devices may maneuver the vehicle in order to avoid the object. For example, computing device 110 may use the steering, acceleration and deceleration systems to maneuver vehicle 100 out of the path of object 810.

However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's computing devices may send a signal to the protection system in order to deploy one or more of the active safety mechanisms. For example, the vehicle's computing devices may determine that the vehicle will not be able to safely maneuver out of the way in order to avoid object 810 before the object and vehicle reach impact point 922.

Where an autonomous vehicle's computing devices are able to determine that an impact is imminent, the autonomous vehicle's computing devices may work to deploy the airbag systems in advance of the impact. Once an impact is determined to be imminent, specific airbags may deploy based upon information from various internal sensors which detect an passenger's position within the vehicle, whether passenger is in safety feature (such as seat belts), whether passenger is in standard (i.e. feet on ground, back against chair, etc.) or non-standard position (i.e. lying down, legs off ground, seat rotated 90 degrees, etc.), position of surrounding objects, etc. Based on monitored position, the computing devices may decide which airbag systems of the vehicle to deploy. For example and as shown in FIG. 7, in a face-to-face seating configuration, airbags for seat 710 may be deployed from an opposing seat 720 if a pressure, temperature, or other sensor detects that the opposite seat 720 is not occupied by another passenger.

Once the computing devices have determined to deploy the airbag system, a signal from the computing devices may trigger ignition of a gas generator propellant to rapidly inflate the airbag. A signal from the computing devices may also position the locking portion to align with the locking feature of the airbag system to be deployed. The airbag may be deployed and interlocked with vehicle structure at the locking portion using a locking feature as described above.

For example and referring to FIG. 6A-6B, after deployment, one end 632 of the ball pin projection 630 may slide through a first side 622 of the one or more one-way hinge locks 620. Referring to FIG. 6C, after the ball 632 fully passes through the one way hinge locks 620, the surface of the ball 632 may engage with a second side 624 of the one or more one-way hinge locks 620 to remain securely in place.

Figure 10:
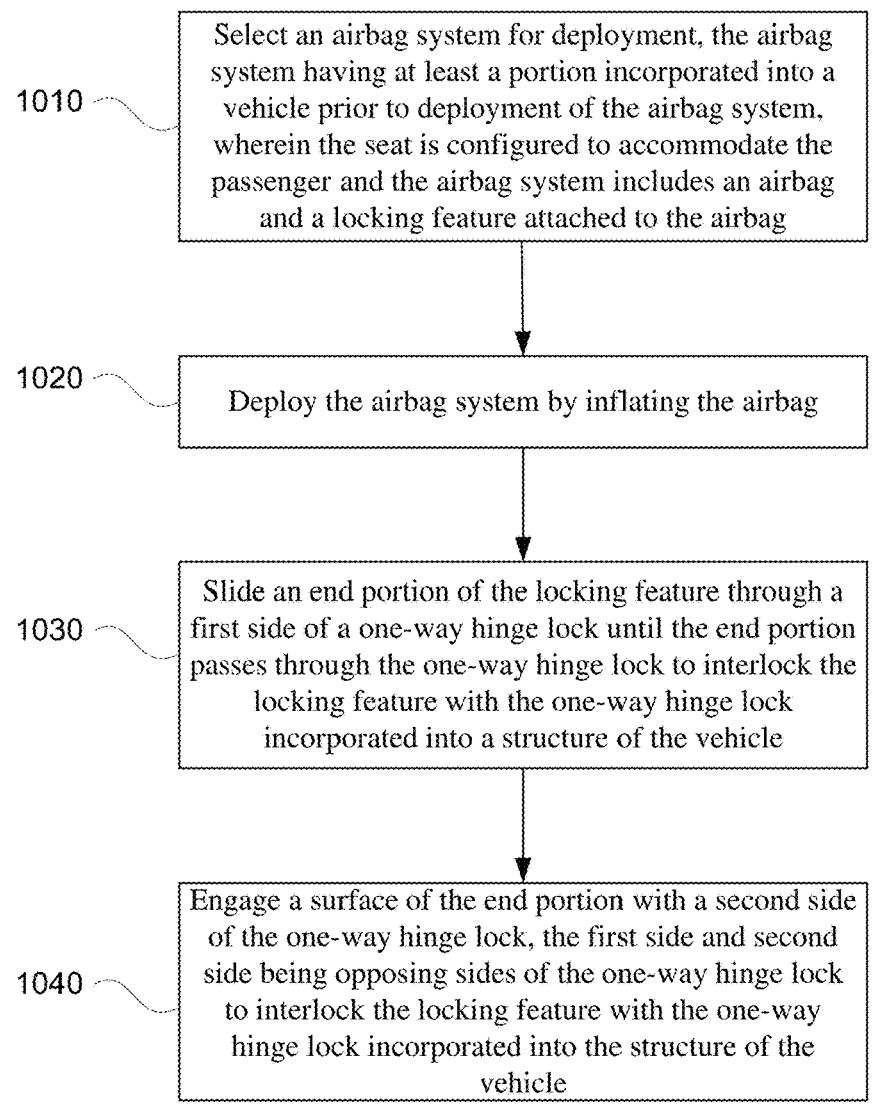
FIG. 10 is an example flow diagram in accordance with aspects of the disclosure.

FIG. 10 is an example flow diagram 1000 including a method for reducing likelihood of injury to a passenger in a collision, in accordance with some of the aspects described above. For example, at block 1010, an airbag system is selected for deployment. The airbag system may have at least a portion incorporated into a vehicle prior to deployment of the airbag system. As an example, the airbag system may have at least a portion incorporated into one or more of a seat, floor, door panel, center console, or headliner of the vehicle prior to deployment. The seat is configured to accommodate the passenger. The airbag system may include an airbag and a locking feature attached to the airbag.

At block 1020, the airbag system is deployed by inflating the airbag. At block 1030, an end portion of the locking feature is slid through a first side of a one-way hinge lock until the end portion passes through the one-way hinge lock to interlock the locking feature with the one-way hinge lock incorporated into a structure of the vehicle. At block 1040, a surface to the end portion is engaged with a second side of the one-way hinge lock to interlock the locking feature with the one-way hinge lock incorporated into the structure of the vehicle. The first side and second side are opposing sides of the one-way hinge lock.

Figure 11B:
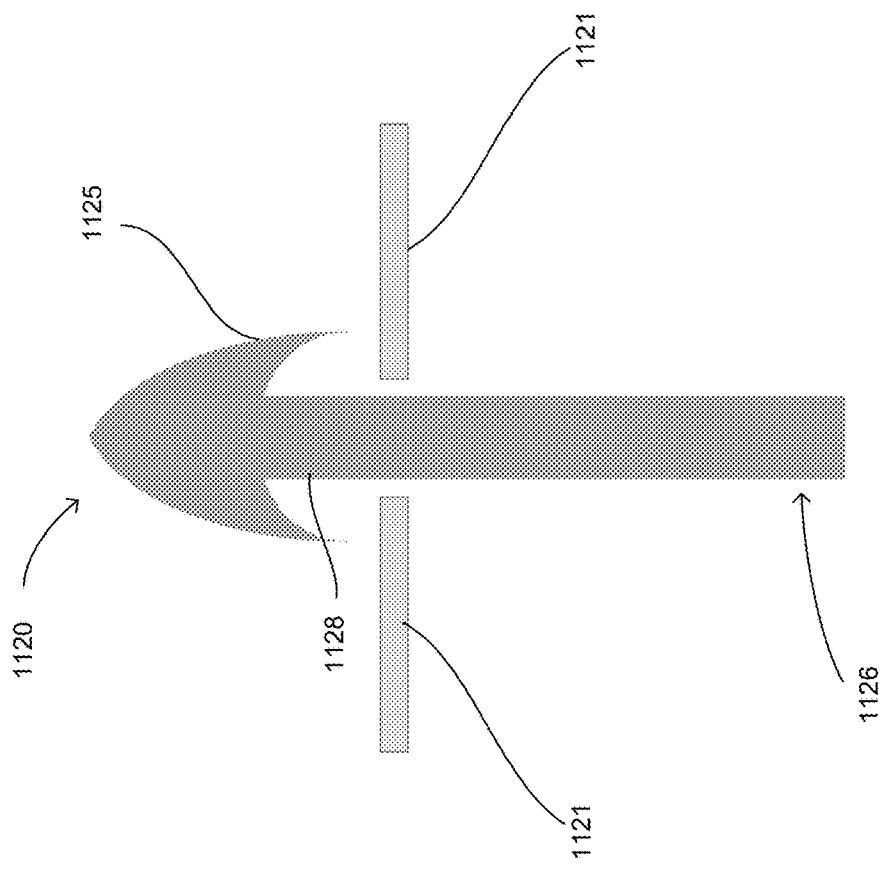
Figure 11A:
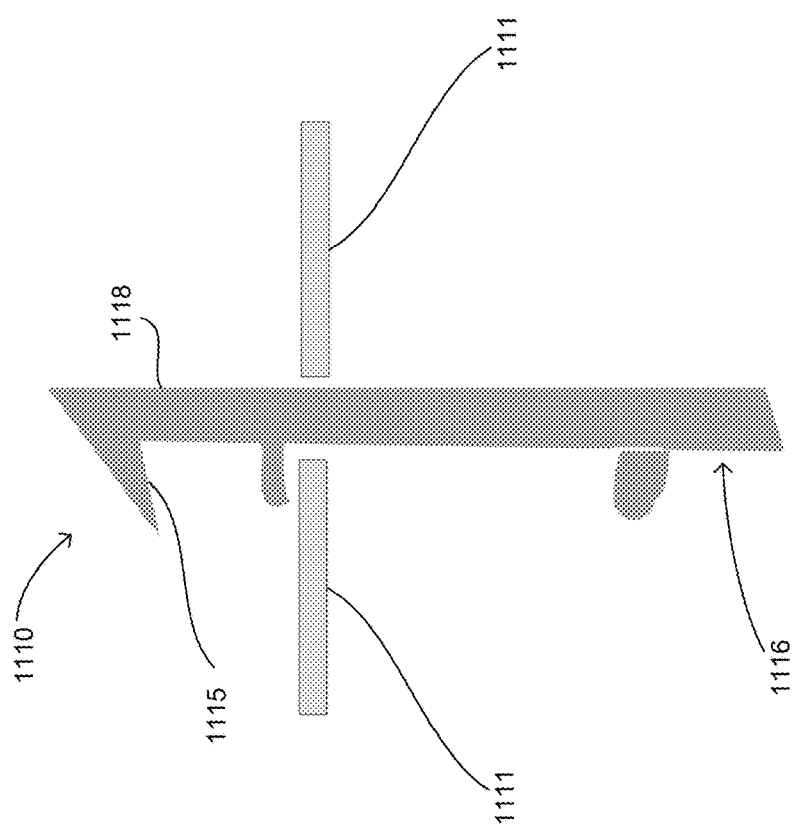

In another embodiment, a locking feature may also include piercing locks that can pierce through the locking portion and remain securely in place. For example, FIGS. 11A-11C provides examples of three types of piercing locking features. Referring to FIG. 11A, one of the locking features includes a barb projection 1110 with a sharp angled barb shape 1115 attached to one end 1118 of a projection 1116 attached to the airbag of the airbag system (not shown). The barb 1115 may pierce through a first side of a locking portion 1111, thereby creating an opening in and through the locking portion, and engage with a second side of the locking portion 1111. FIG. 11B depicts another locking feature configured as a harpoon projection 1120, having a harpoon shape 1125 attached to one end 1128 of a projection 1126 attached to the airbag of the airbag system (not shown). The harpoon 1125 may pierce through a first side of a locking portion 1121, thereby creating an opening in and through the locking portion, and engage with a second side of the locking portion 1121.

In a third example, shown in FIG. 11C, the locking feature may include an arrowhead 1130 with foldable wings. The arrowhead 1130 may have a projection 1132 with a sharp end 1134 and one or more foldable wings 1136. The wings 1136 may initially be at location 1138 folded away from sharp end 1134. Sharp end 1134 may pierce through a first side of the locking portion 1131. After sharp end 1134 fully passes through locking portion 1131, wings 1136 may be at location 1139 folded towards sharp end 1134 and engaged with a second side of locking portion 1131.

In some embodiments, the locking feature and locking portion may also include magnets, for instance electromagnets. Magnets may provide an additional advantage of speeding up deployment. For instance, a magnet of the locking feature and a magnet of the locking portion may be arranged such that once the locking feature is deployed, the opposing poles of the magnets are oriented towards one another. Thus, once the airbag system is deployed, the magnetic field caused by the locking feature may pull the locking feature towards the magnet (and magnetic field) of the locking portion. Locking features with magnets may be designed to avoid hitting passenger due to fast deployment.

In some embodiments, the locking feature and the locking portion may also include hook and loop arrangements. For example, a first part of a hook-and-loop fastener (such as a Velcro® fasteners) may be attached to a locking portion, such as the headliner. A second and separate part of the hook-and-loop fastener may be attached to the airbag of the airbag system. Upon deployment of the airbag system, the first and second part of the hook-and-loop fastener may attach to each other and interlock the airbag with the locking portion.

Figure 12:
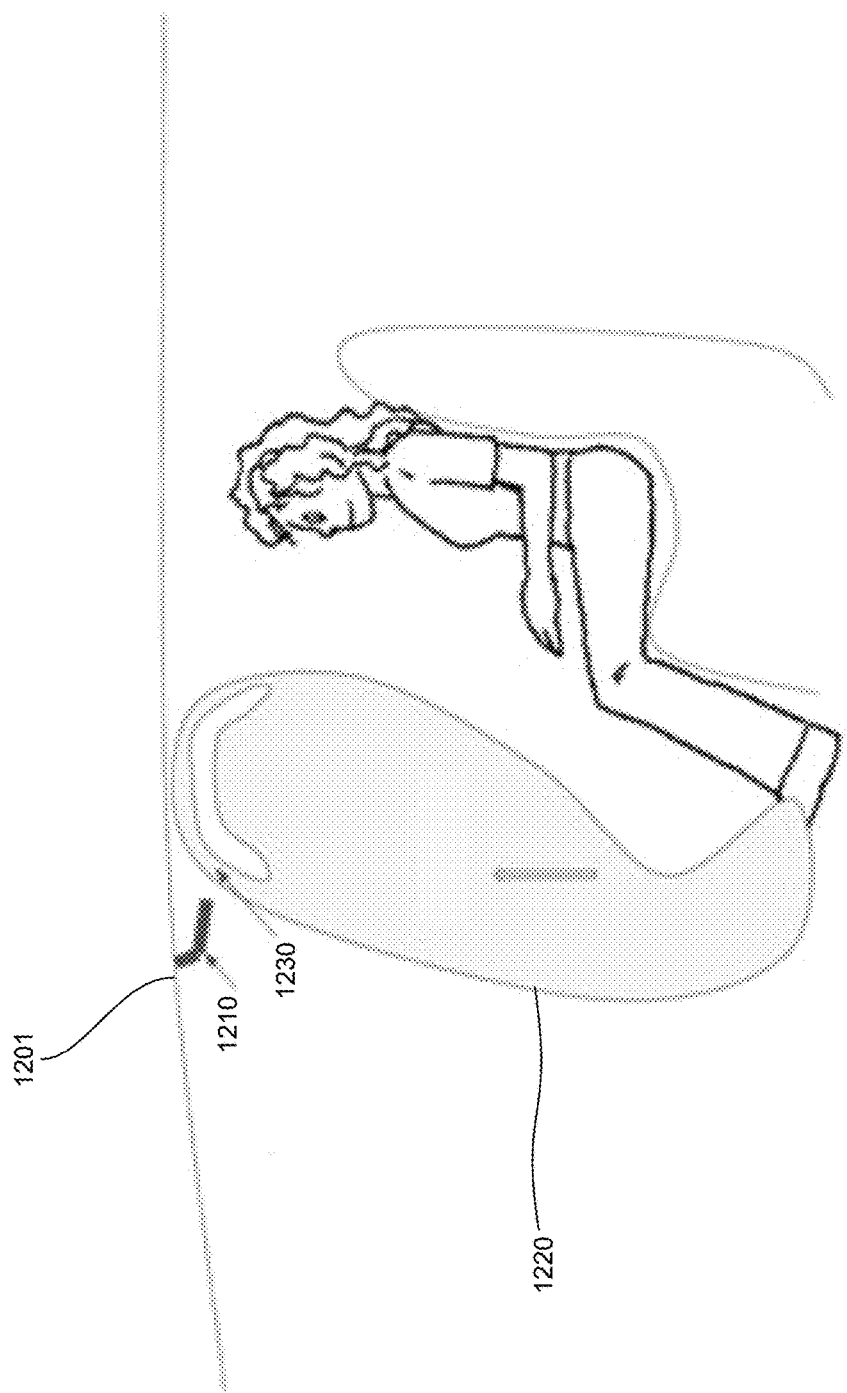
FIG. 12 is an example airbag system for a vehicle in accordance with aspects of the disclosure.

In another example, a locking portion may include a hook pointing towards the direction of an airbag with a locking feature and the locking feature may include a loop opening or tether incorporated into an airbag of the airbag system. As shown in FIG. 12, locking portion 1201 incorporated into the headliner or roof structure of vehicle 100 may include a rear facing hook 1210 pointing downwards in the direction of airbag 1220. The locking feature may further include a loop opening or tether 1230 on the upper edge of airbag 1220. Once the airbag system is deployed, the hook 1210 maybe inserted into the loop opening or tether 1230 thereby interlocking locking portion 1201 to airbag 1220.

In addition or alternatively, the locking feature and locking portion may also include adhesive materials. For instance, an adhesive material on the locking feature may be arranged such that once the locking feature is deployed, the airbag may thrust onto the locking portion and the adhesive material of the locking feature on the airbag may cause the airbag to stick to the locking portion. In another embodiment, the locking feature may include a one way snap.

In some embodiments, the airbag system may include multiple airbags that interlock with one another to form an enclosure. The airbags may have staggered inflation times. After a first airbag inflates, a second airbag may inflate subsequently to capture the first airbag securely in place.

For instance, the airbag system may include a lower airbag used as a reaching airbag and an upper airbag used as a locking airbag. The reaching airbag may include a locking feature configured to interlock the reaching airbag with a locking portion of the locking airbag. The locking portion may be a slot included in the locking airbag. Upon deployment, the reaching airbag may inflate and reach the locking airbag. The locking feature of the reaching airbag may align with the slot in the locking airbag. Then the locking airbag may also inflate and stiffen, contracting the slots therein, which may capture the reaching airbags securely in place.

Figure 13A:
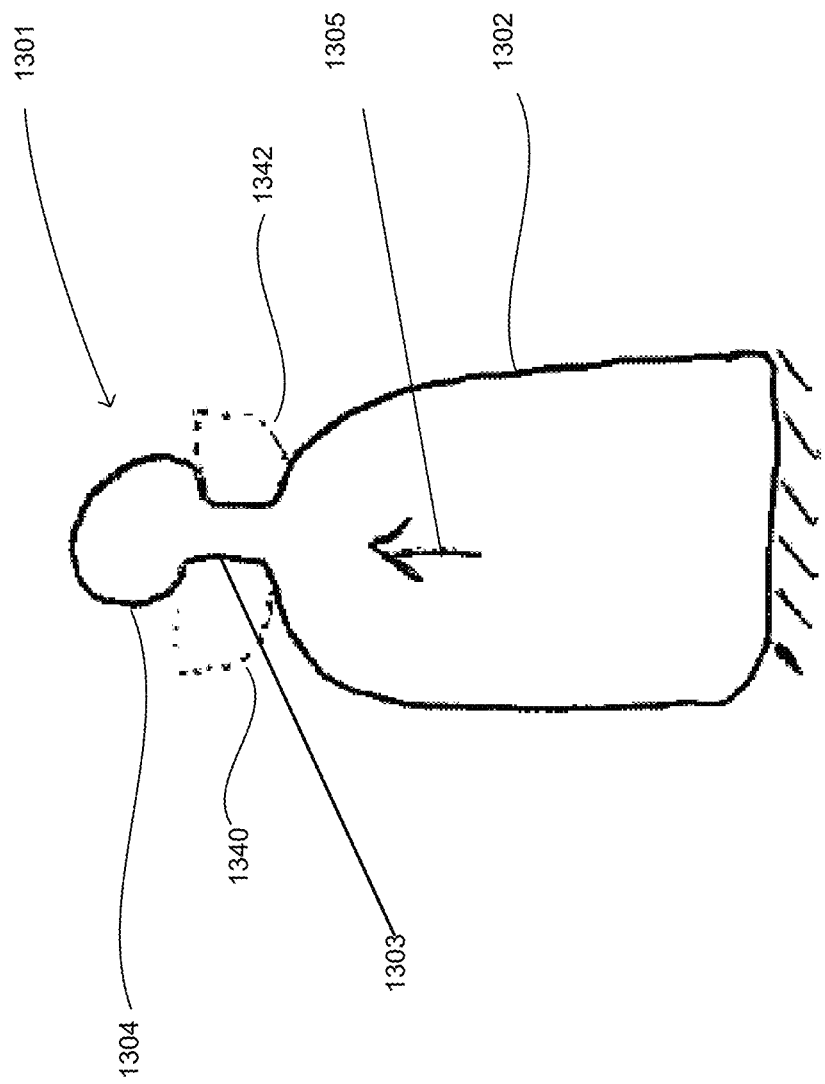
FIGS. 13A-13U are example airbag systems for a vehicle in accordance with aspects of the disclosure.

For example, as shown in FIG. 13A, an airbag system may include a reaching airbag 1301. Reaching airbag 1301 may expand in the direction of arrow 1305 during deployment. Once inflated, one end of the reaching airbag 1301 may include a neck portion 1303 that is narrower than the main body 1302 of the airbag and a locking feature 1304, such as a ball or other shape larger in diameter than the neck portion 1303.

FIG. 13B shows, for example, the bottom view of a deflated state of a locking airbag 1320, which is incorporated into the headliner of the vehicle. Locking airbag 1320 includes extra fabric 1324 folded on itself. Locking airbag 1320 also includes slot 1326, which may be a slit or a hole. FIG. 13C shows a cross sectional view A-A of the deflated locking airbag 1320, depicting from the side the extra fabric 1324 folded on itself. At or prior to collision, reaching airbag 1301 (shown in FIG. 13A) is deployed and locking feature 1304 passes through slot 1326. Subsequently, the system may begin to inflate locking airbag 1320. FIG. 13C shows the bottom view of locking airbag 1320 when it is fully inflated. Extra fabric 1324 inflates into an expanded stiff shape. As a result, slot 1326 contracts and securely holds the locking feature 1304 of the reaching airbag 1301 in place. FIG. 13F shows a cross sectional view A-A of the inflated locking airbag 1320, depicting the contracted slot 1326 from the side.

Figure 13J:
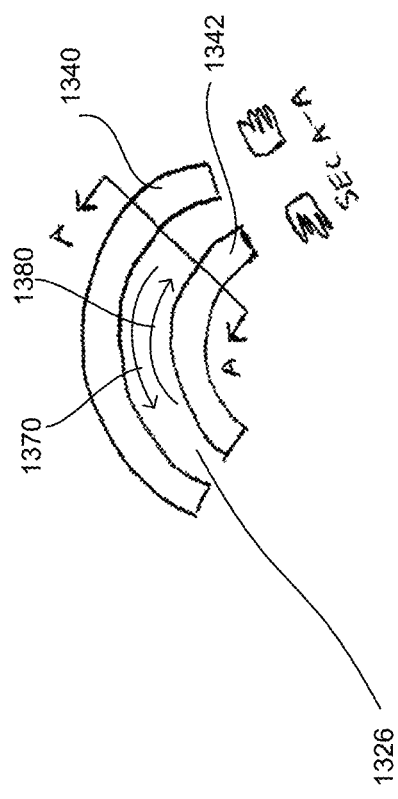
Figure 13K:
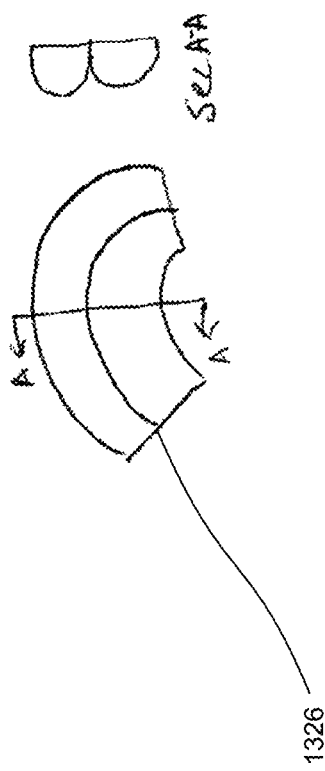

FIGS. 13F-13K, for example, depict variations of the locking airbags. For instance, as shown in FIG. 13F, deflated locking airbags 1340 and 1342 are arranged linearly next to one another, in a "linear bumper" arrangement. A slot 1326 separates the two airbags. FIG. 13G shows a cross sectional view A-A of the deflated linear bumper arrangement. At or prior to collision, reaching airbag 1301 is deployed and the locking feature 1304 fits into slot 1326. Then the system may begin to inflate locking airbags 1340 and 1342. FIG. 13H shows the locking airbags when they are fully inflated. As a result, slot 1326 contracts to capture locking feature 1304 and neck portion 1303 of reaching airbag 1301. FIG. 13I shows a cross sectional view A-A of the locking airbags 1340 and 1342, depicting the contracted slot 1326. FIG. 13J-K, for example, shows a "radial bumper" arrangement of the airbags where the locking airbags 1340 and 1342 are arranged in a concentric arrangement next to one another instead of the linear arrangement as in FIGS. 13F-13I.

FIGS. 13L-13U, for example, shows the sequence of deployment of the interlocking airbags with the locking airbags having a linear bumper arrangement. FIG. 13L-13P shows the side view of the airbags during the progression while FIGS. 13Q-13U shows the top-down view of the corresponding airbags. In FIGS. 13L and 13Q, locking airbags 1340 and 1342, and reaching airbag 1301 are all in deflated state. In FIGS. 13M and 13R, reaching airbag 1301 starts to inflate. In FIGS. 13N and 13S, reaching airbag 1301 is fully inflated, and locking feature 1304 has passed through slot 1326. Then in FIGS. 13O and 13T, locking airbags 1340 and 1342 begins to inflate. In FIGS. 13P and 13U, locking airbags 1340 and 1342 are fully inflated and slot 1326 contracted, capturing locking feature 1304 securely in place.

In some embodiments, the locking airbags may have multiple slots. Multiple slots may allow reaching airbags to move in correspondence with a movement of the seats. As the reaching airbag moves from one location to another with the seat, it may change its alignment from one slot to the next slot in the locking airbag. In such an arrangement, the locking portion does not need to adjust with the movement of the passenger or seat. For example, as shown in FIG. 13B, locking airbag 1320 may include additional slots 1350 and 1360. Initially, reaching airbag 1301 may be aligned with slot 1326. However, when the seat moves, reaching airbag 1301 also moves from the location underneath slot 1326, and reaching airbag 1301 becomes aligned with the next slot 1350 or 1360, ready to be interlocked upon deployment. Additionally, the linear bumper or the radial bumper arrangements also serve the purpose of moving with the seat. For example, as shown in FIGS. 13F and 13J, slot 1326 may include a continuous gap between airbags 1340 and 1342. The continuous gap allows reaching airbag 1301 to move along the path of the gap in either direction 1370 or 1380, eliminating the need for the locking airbag to move along with the seat.

Figure 14A:
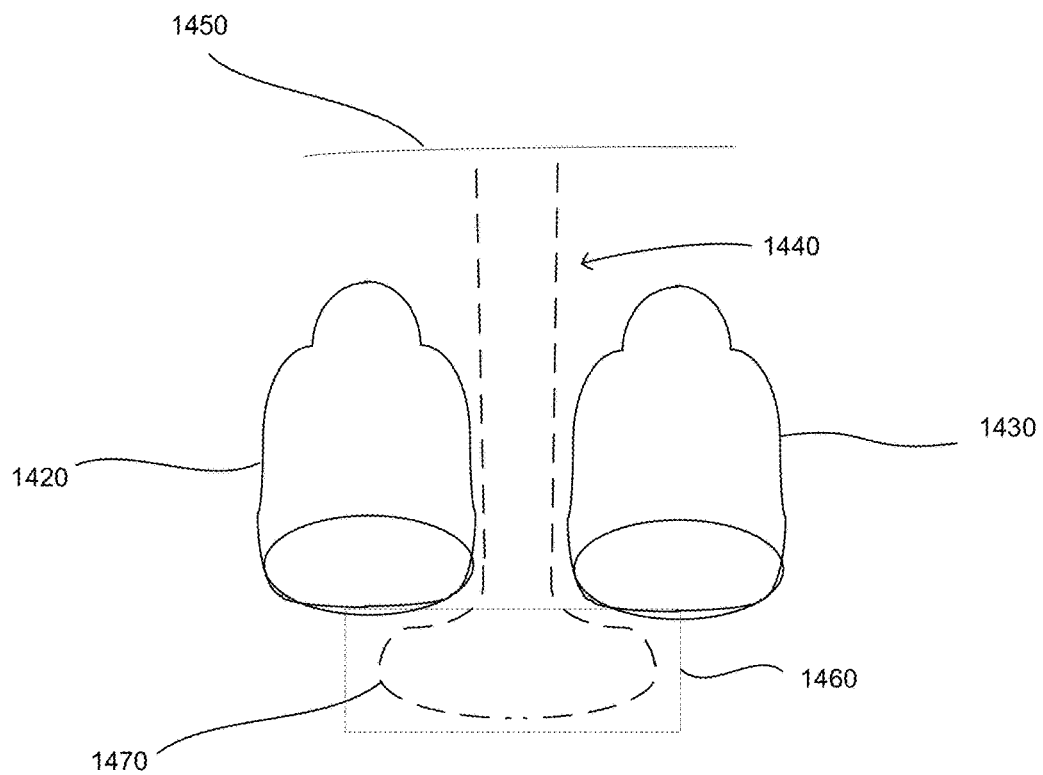
FIGS. 14A-14B are example airbag systems for a vehicle in accordance with aspects of the disclosure.
Figure 14B:
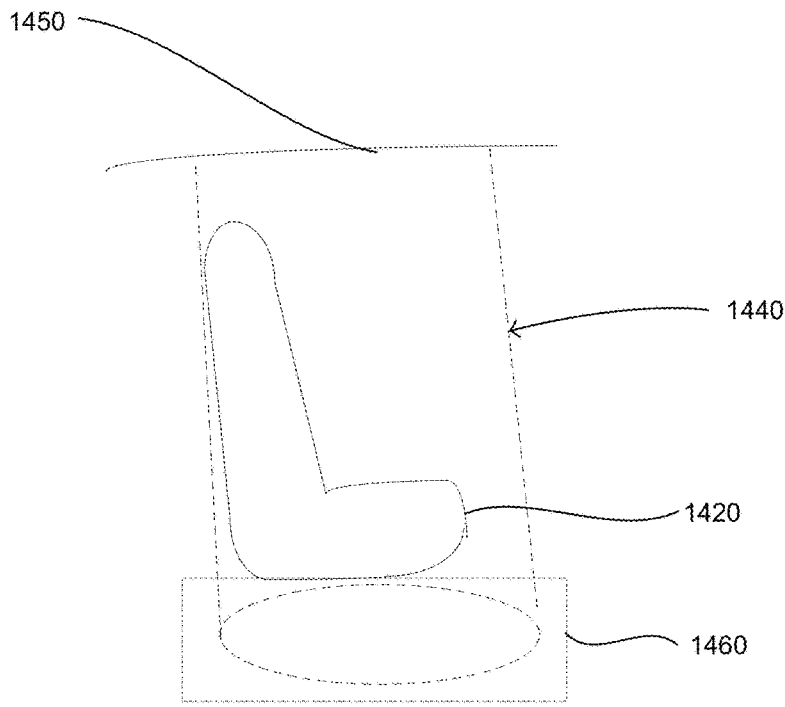

In some embodiments, instead of a separate locking feature being attached with or incorporated into an airbag, existing vehicle structures may be used for interlocking the airbag with a locking portion that is part of the vehicle's structure. For instance, as shown in FIGS. 14A (front view) and 14B (side view), an existing vehicle structure, such as the space between two adjacent seats 1420 and 1430, may be used to accomplish the interlocking. For example, airbag 1440 may be stored on the headliner or roof structure 1450 of vehicle 100 and an underhang 1460 may exist beneath seats 1420 and 1430. Upon deployment, a projecting end 1470 of the airbag 1440 may deploy downward and hook along the bottom of the seats 1420 and 1430 within the underhang 1460. This would also eliminate the need for projecting barbs, harpoons or tethers through a vehicle structure.

The shape of the airbag may be changed according to information from the sensors. In some embodiments, the shape of the airbag may be rectangular. In some embodiments, the system may estimate weight and/or height of the passenger to change the shape of airbag using various venting techniques. In addition to venting, shape of airbag may be adjusted with changes to gas pressure, selectively controlling chamber inflation, and through the presence of selectable and/or controllable straps internal to the airbags. In another embodiment, the system may change the shape of airbag based on passenger's position and orientation within a seat. Additionally, if an alternate seating configuration is used, such as in a face-to-face seating configuration, both the seat orientation and passenger orientation may be taken into consideration for adjusting shape of the airbag.

In some embodiments, a single deployable structure may serve more than one passenger. For example, an airbag may be disposed between two adjacent seats and serve as partial enclosure to both of the seats after deployment.

Although the examples described herein use airbags as deployable structures, other confining structures may also be used. For example, structures like curtains, nets, or shades may be used as deployable structures to protect passengers in the event of a collision. For instance, as shown in FIGS. 15A-15E, drawn curtains may be used as deployable structures. Curtains may be made from solid fabric, mesh, or netting material. The curtains may be stored in the side and/or ceiling of the interior of a vehicle. During deployment, the curtain gradually extends along covered tracks in the floor and/or interior ceiling, which causes the curtain to wrap around a passenger. The curtain may be drawn using a retractable cable, rope, strap, or other similar elements through the leading edge of the curtain. Alternatively, the curtain may be drawn by retracting the upper leading corner of the curtain along the tracks on the ceiling and the lower leading corner of the curtain along the tracks on the floor.

Figure 15A:
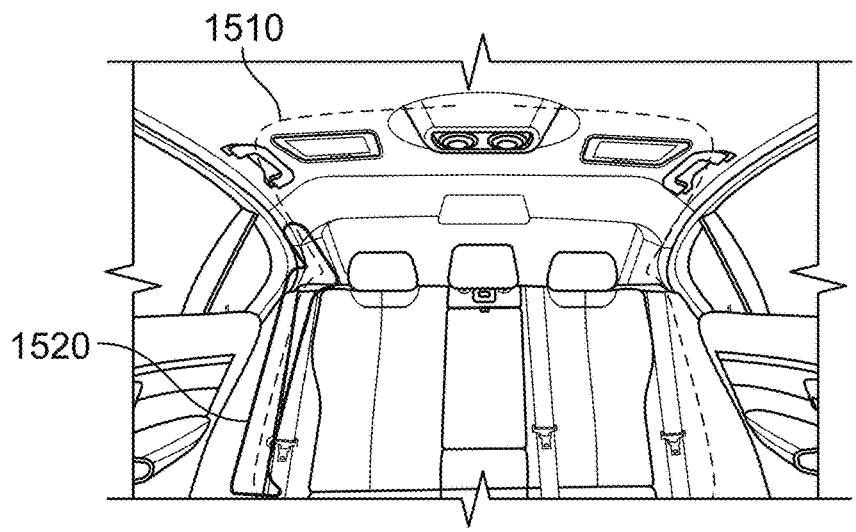
FIGS. 15A-15E are examples of deployable structure in accordance with aspects of the disclosure.
Figure 15B:
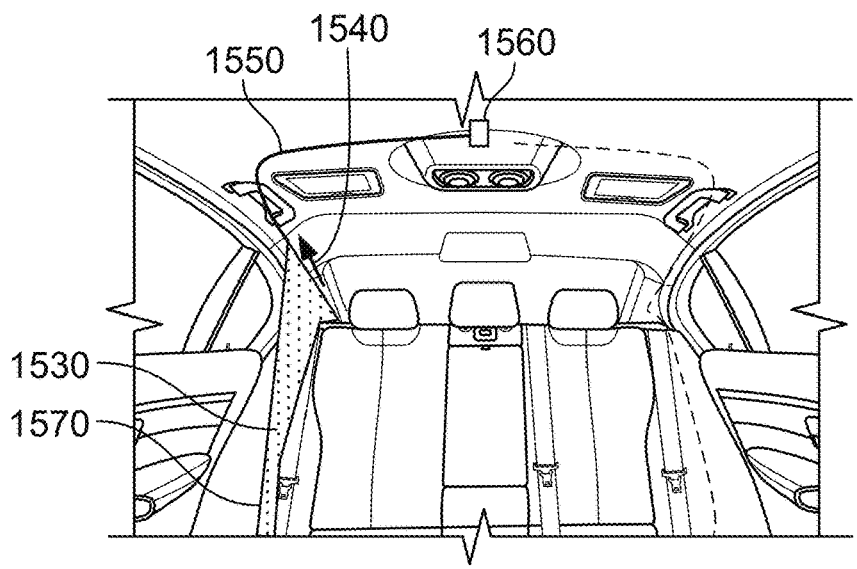
Figure 15C:
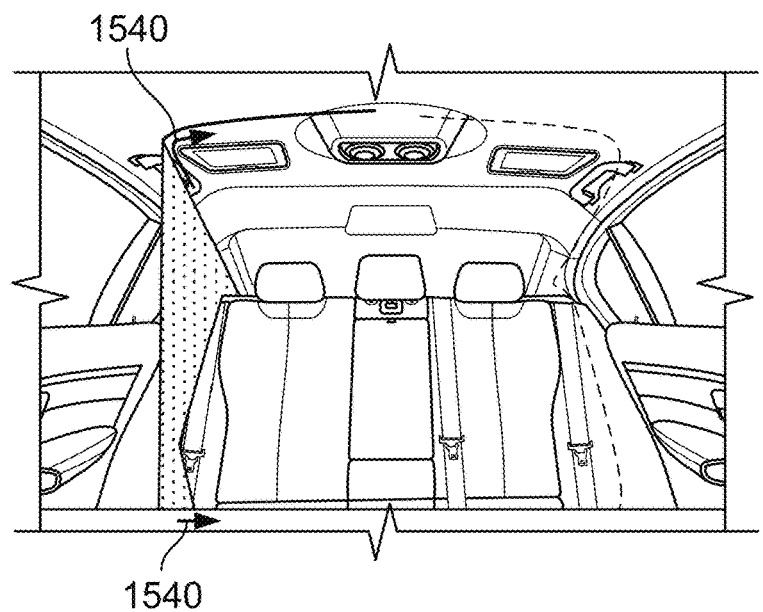
Figure 15D:
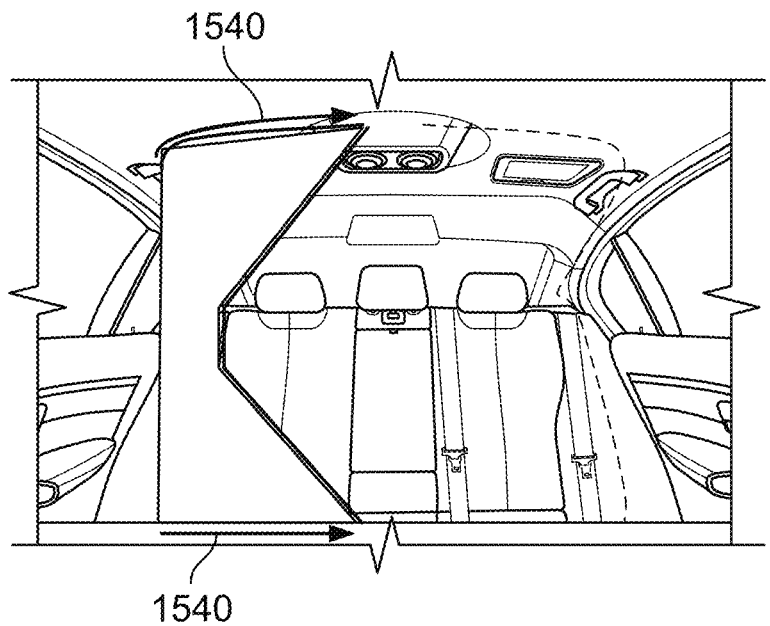
Figure 15E:
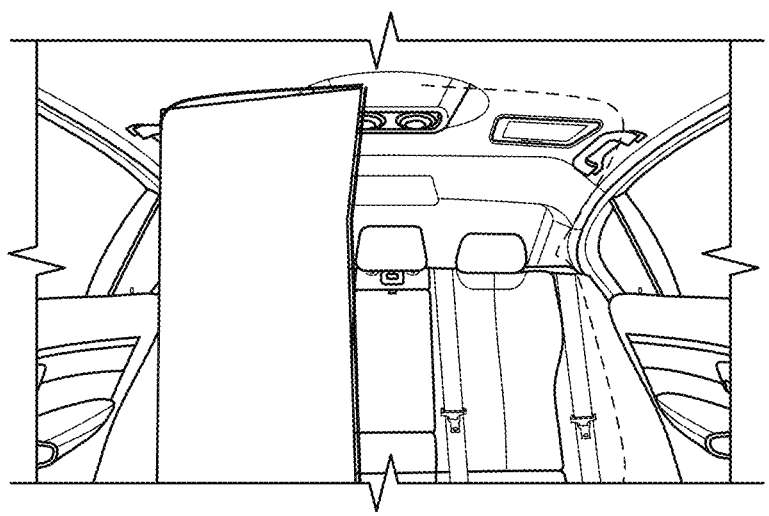

FIG. 15A shows a covered track 1510 on the headliner and storage location 1520 on the side of the vehicle where the curtain is stored before deployment. FIG. 15B shows a curtain 1530 being drawn out of the storage location 1520 after deployment. A cable retractor 1560 is used to retract the cable 1550 through the leading edge 1570 along path 1540 to deploy curtain 1530. FIGS. 15C-15E shows the gradual extension of curtain 1530 along covered tracks 1510 in path 1540. FIG. 15E shows curtain 1530 fully extended to wrap around a passenger. Two such curtains may be used and drawn towards one another from opposite sides of a single or multiple passengers. Alternatively, a single curtain may extend across all passengers.

Figure 16A:
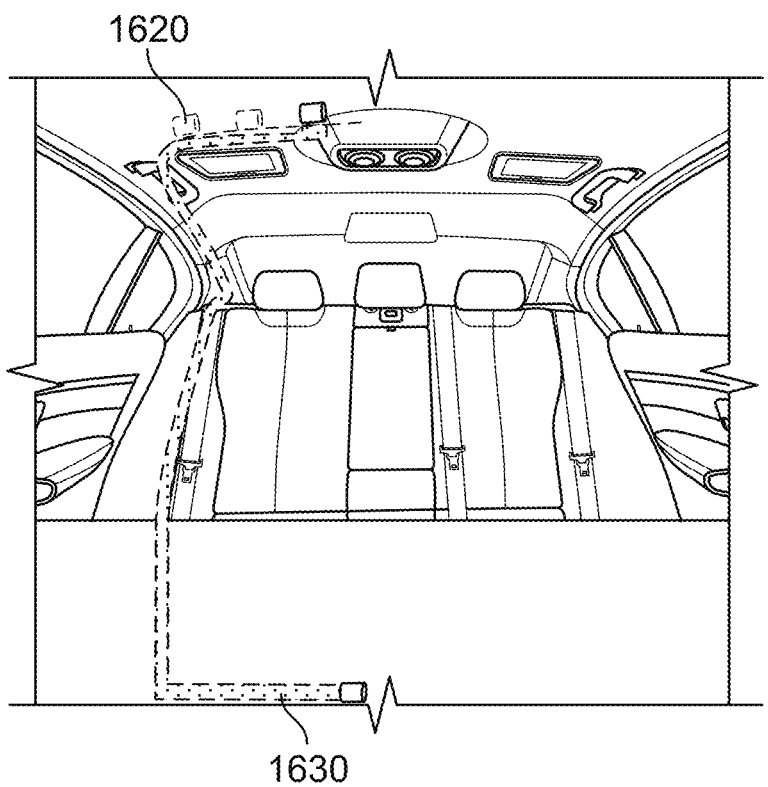
FIGS. 16A-16B are examples of deployable structure in accordance with aspects of the disclosure.
Figure 16B:
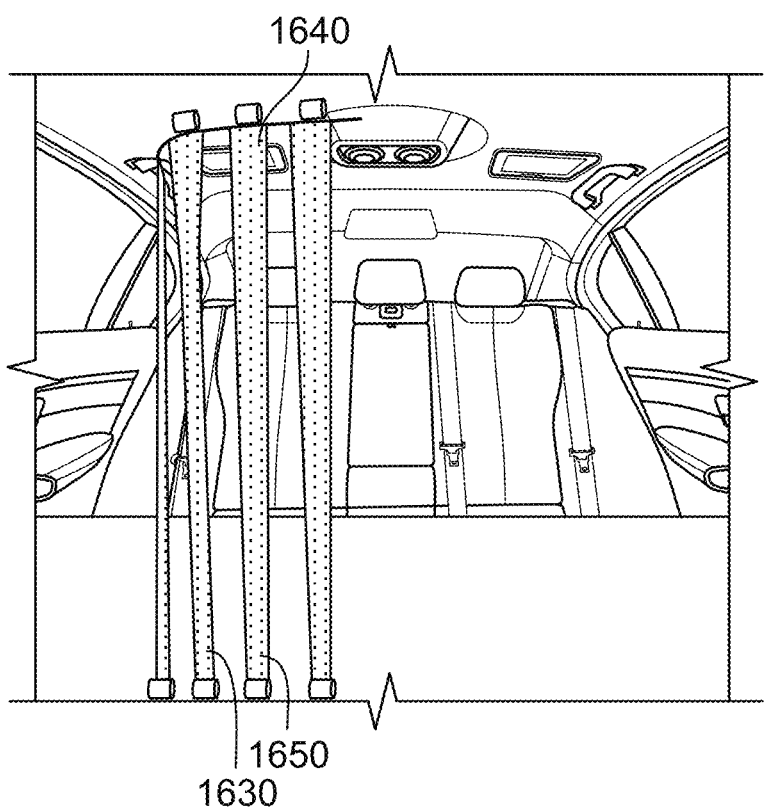

In another example, as shown in FIGS. 16A-16B, tensioned strip curtains may be used as deployable structures. FIG. 16A shows long individual curtain strips 1630 stored along the headliner, side and floor of the vehicle. At deployment, as shown in FIG. 16B, the ends 1640 and 1650 of strips 1630 are tensioned using a tensioner 1620, which pulls the strips straight and taut between the floor and the ceiling, thereby enclosing the passenger. There may be a gap between the strips as shown in FIG. 16B. The gap may be replaced with fabric. Alternatively, the strips may overlap (not shown) each other to fully enclose the passenger.

In another example, curtains may be stored in the side of the vehicle at the front edge of the door opening (not shown). The curtains may also deploy transversely across the entire cabin in front of the passengers.

Figure 17A:
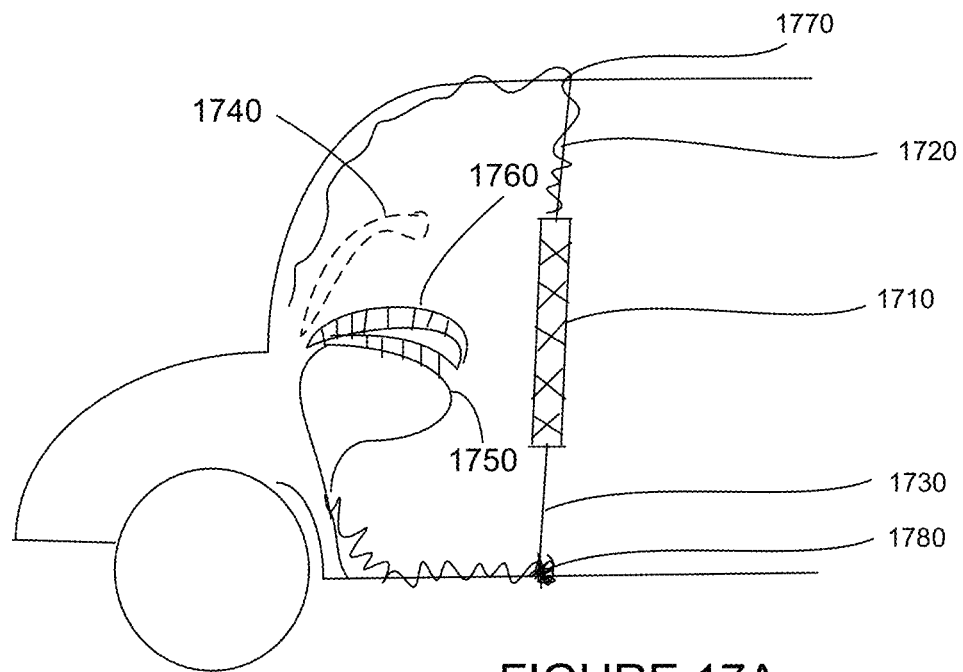
FIGS. 17A-17C are examples of deployable structure in accordance with aspects of the disclosure.
Figure 17B:
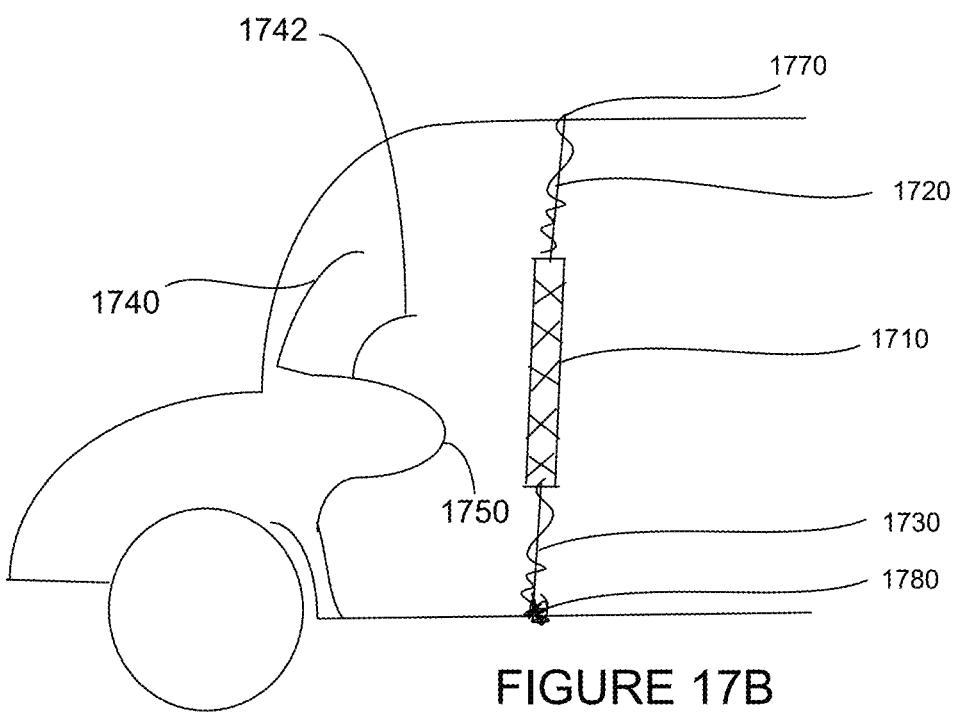
Figure 17C:
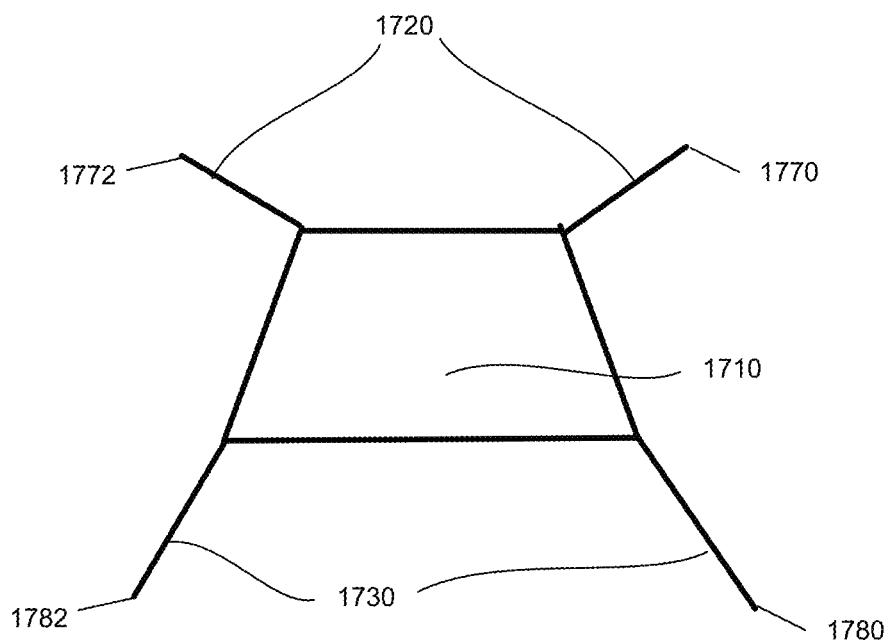

In another embodiment, as shown in FIGS. 17A-17C, nets and straps may be used together to prevent or reduce injury to a passenger in the event of a collision. As an example, straps may include belts, strings, wires, cables, etc. Initially, prior to deployment, the net 1710, upper straps 1720, lower straps 1730 may be stored within various portions of the vehicle. For example, upper straps 1720 may be stored under or within the A-pillar covers 1740, 1742 of the vehicle (shown as deployed in both FIGS. 17A and 17B). Prior to deployment, the A-pillar covers would be attached to the A-pillars of the vehicle. Lower straps 1730 may also be stored within the dashboard 1750. Net 1710 may also be stored within the dashboard 1750, for instance, behind a pivoting hatch 1760 (depicted slightly open in FIG. 17A and closed in FIG. 17B). After deployment, the straps 1720 and 1730 may be pulled, for instance using a motor, along respective tracks from the A-pillars towards a mounting point 1770, 1772. Similarly, after deployment, the straps 1720 and 1730 may be pulled, again using a motor, along a track from the dashboard towards a mounting point 1780, 1782. This pulling may also pull net 1710 from the dashboard and towards a passenger sitting behind the dashboard (not shown). This may cause the net to be extended in front of the passenger and in the event of a collision, cause the passenger to hit the net rather than the dashboard. In order to slow the passenger's forward progress in a collision, the net may flex and absorb some of the energy from the passenger. FIG. 17C is a frontal view of a fully deployed net; the vehicle being not shown for simplicity.

Additionally, although the examples described herein are related to the use of vehicles when operating in autonomous driving modes, such features may also be useful for vehicles operating in manual or semi-autonomous modes or for vehicles having only manual driving mode and semi-autonomous driving modes. Any vehicles which include mechanism to sense threat of collision and control actions within the vehicle may use the deployable structures and methods described herein. In such cases, an active safety mechanism may be identified as discussed above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for reducing likelihood of injury to a passenger in a collision, the system comprising:
   an airbag system including:
   an airbag configured to expand when the airbag system has been deployed; and
   a locking feature attached to the airbag and configured to lock the airbag with a locking portion of a vehicle after the airbag system has been deployed, wherein the locking feature is configured to penetrate of the locking portion to create an opening in and through a first side of the locking portion.

2. The system of claim 1, further comprising the vehicle having a first seat configured to accommodate the passenger.

3. The system of claim 2, wherein the locking portion is configured to rotate in correspondence with rotation of the first seat prior to deployment of the airbag system.

4. The system of claim 2, wherein the locking portion is configured to translate relative to a structure of the vehicle in correspondence with a translation movement of the first seat of the vehicle prior to deployment of the airbag system.

5. The system of claim 1, further comprising the locking portion, and wherein the locking portion is configured to be incorporated into a structure of the vehicle.

6. The system of claim 1, wherein the locking portion is configured to rotate relative to a structure of the vehicle prior to deployment of the airbag system.

7. The system of claim 1, wherein the locking feature includes a barb projection.

8. The system of claim 7, wherein the barb projection has a sharp angled barb shape attached to one end of a projection attached to the airbag of the airbag system.

9. The system of claim 1, wherein the locking feature includes a harpoon projection having a harpoon shape attached to one end of a projection attached to the airbag of the airbag system.

10. The system of claim 1, wherein the locking feature includes an arrowhead.

11. The system of claim 10, wherein the arrowhead includes a projection with a sharp end and one or more foldable wings.

12. The system of claim 11, wherein the wings are initially folded away from the sharp end, and after the sharp end penetrates the locking portion, the wings fold towards the sharp end and engage with a second side of the locking portion.

13. The system of claim 1, wherein the locking feature is configured to create the opening in and through the first side of the locking portion in order to engage with a second side of the locking portion after the airbag system is deployed.

14. The system of claim 1, further comprising a motor configured to facilitate movement of the locking portion relative to a structure of the vehicle prior to deployment of the airbag system.

15. The system of claim 14, wherein the motor is configured to rotate the locking portion in conjunction with a corresponding rotation of a first seat of the vehicle.

16. The system of claim 1, further comprising the vehicle, wherein a first portion of the airbag is incorporated into a first seat of the vehicle prior to deployment of the airbag system.

17. The system of claim 16, wherein a second portion of the airbag system is incorporated into a second seat of the vehicle.

18. The system of claim 17, wherein when the second seat is oriented towards the first seat in the vehicle, the second portion and the first portion are configured to form a partial enclosure around the first seat when the airbag system has been deployed in order to reduce the likelihood of injury to the passenger when the passenger is in the first seat.

19. A system for reducing likelihood of injury to a passenger in a collision, the system comprising:
 a vehicle; and
 an airbag system including:
 an airbag configured to expand when the airbag system has been deployed; and
 a locking feature attached to the airbag and configured to lock the airbag with a locking portion of the vehicle after the airbag system has been deployed,
 wherein a first portion of the airbag is incorporated into a first seat of the vehicle prior to deployment of the airbag system,
 wherein a second portion of the airbag system is incorporated into a second seat of the vehicle, and
 wherein when the second seat is oriented towards the first seat in the vehicle, the second portion and the first portion are configured to form a partial enclosure around the first seat when the airbag system has been deployed in order to reduce the likelihood of injury to the passenger when the passenger is in the first seat.

20. The system of claim 19, wherein the locking portion is configured to rotate relative to a structure of the vehicle prior to deployment of the airbag system.

21. The system of claim 19, wherein the locking portion is configured to rotate in correspondence with rotation of the first seat prior to deployment of the airbag system.

22. The system of claim 19, wherein the locking portion is configured to translate relative to a structure of the vehicle in correspondence with a translation movement of the first seat of the vehicle prior to deployment of the airbag system.

* * * * *